(12) United States Patent
Umeda

(10) Patent No.: US 7,409,521 B2
(45) Date of Patent: Aug. 5, 2008

(54) METHOD OF MANAGING STORAGE CAPACITY, SERVER AND RECORDING MEDIUM THEREFOR

(75) Inventor: Takashi Umeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 11/239,064

(22) Filed: Sep. 30, 2005

(65) Prior Publication Data

US 2006/0020664 A1    Jan. 26, 2006

Related U.S. Application Data

(63) Continuation of application No. PCT/JP03/08224, filed on Jun. 27, 2003.

(51) Int. Cl.
G06F 12/00 (2006.01)
(52) U.S. Cl. ..................................... 711/170
(58) Field of Classification Search ................. 711/112, 711/114, 148, 153, 170, 173
See application file for complete search history.

(56) References Cited

U.S. PATENT DOCUMENTS

| | | |
|---|---|---|
| 2002/0078193 A1 | 6/2002 | Baumeister et al. |
| 2002/0095547 A1 | 7/2002 | Watanabe et al. |
| 2002/0152143 A1 | 10/2002 | Sanada et al. |
| 2002/0152181 A1 | 10/2002 | Kanai et al. |
| 2002/0161980 A1 | 10/2002 | Nishikawa |
| 2003/0055972 A1 | 3/2003 | Fuller et al. |

FOREIGN PATENT DOCUMENTS

| | | |
|---|---|---|
| EP | 1 178 407 | 6/2001 |
| EP | 1 251 424 | 10/2002 |
| JP | 6-19796 | 1/1994 |
| JP | 8-241220 | 9/1996 |
| JP | 9-185536 | 7/1997 |
| JP | 10-40169 | 2/1998 |
| JP | 11-15732 | 1/1999 |
| JP | 2002-7304 | 1/2002 |

(Continued)

OTHER PUBLICATIONS

"Centralized Control of Various Storage by a Single Console," Network World, vol. 7, No. 9, Sep. 1, 2002, pp. 154-157.

(Continued)

Primary Examiner—Hiep T. Nguyen
(74) Attorney, Agent, or Firm—Staas & Halsey LLP

(57) ABSTRACT

By referring to data stored in a capacity management information storage unit, a capacity distribution control unit distributes additional capacity to a supervision target resource whose current available capacity has become less than a prescribed threshold value by using real volumes in the unit's own site when the real volumes in the unit's own site can deal with the situation, and access another site (remote site 50) by using an iSCSI protocol, temporarily use real volume in said another site, and distributes additional capacity to the supervision target resource when the situation can not be dealt with by the real volumes in the unit's own site, and further, an aggregation unit can aggregate data stored in the temporarily used real volumes in said another site to an available region in the unit's own site, and release the temporarily used real volumes in said another site.

10 Claims, 25 Drawing Sheets

FOREIGN PATENT DOCUMENTS

| | | |
|---|---|---|
| JP | 2002-007304 | 1/2002 |
| JP | 2002-091706 | 3/2002 |
| JP | 2002-91706 | 3/2002 |
| JP | 2002-099519 | 4/2002 |
| JP | 2002-215444 | 8/2002 |
| JP | 2002-312689 | 10/2002 |
| JP | 2002-312699 | 10/2002 |
| JP | 2002-324000 | 11/2002 |
| JP | 2003-134141 | 5/2003 |

OTHER PUBLICATIONS

"Data Storage Report 2002," Computer Age, 2002, pp. 21-23, 34-35, 38 and 39.

Miller, Cliff, "Evolving Storage Whose Technology Innovation is Promoted by Demand for Network Connection, " Nikkei Computer, May 6, 2002, pp. 134-141.

Negoro, Gen, "Storage Networking Virtualization," Unisys Technology Review, vol. 74, Aug. 2002, pp. 126-138.

"SNIA Virtualization Tutorials" printed Apr. 2, 2003 from www.snia.org/education/tutorials/virtualization.

Supplementary European Search Report for European Application No. 03 81 7301.9-1245; dated Feb. 5, 2008.

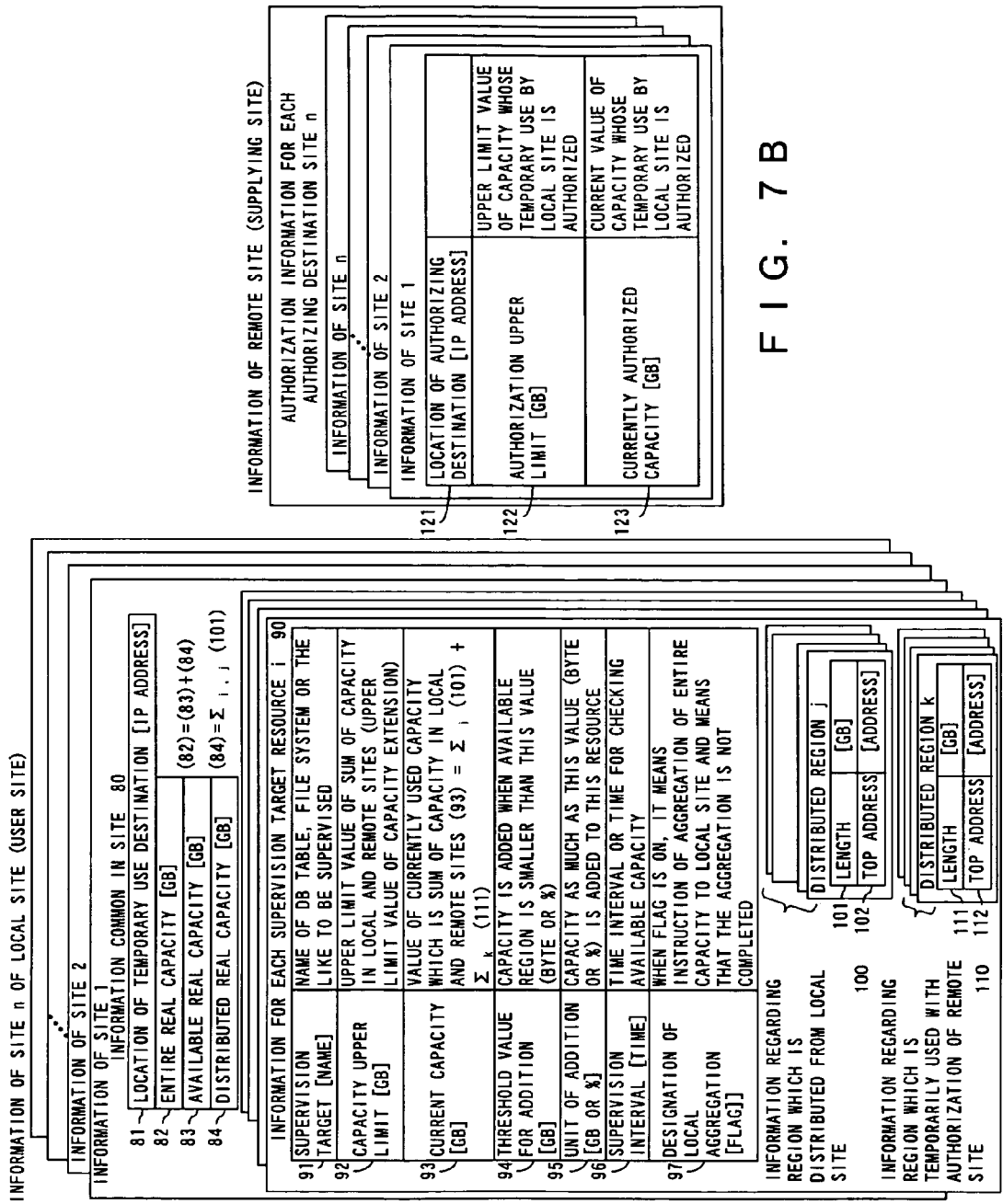

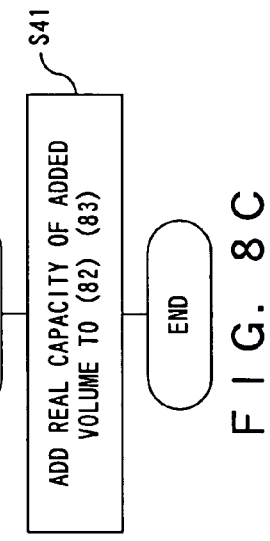
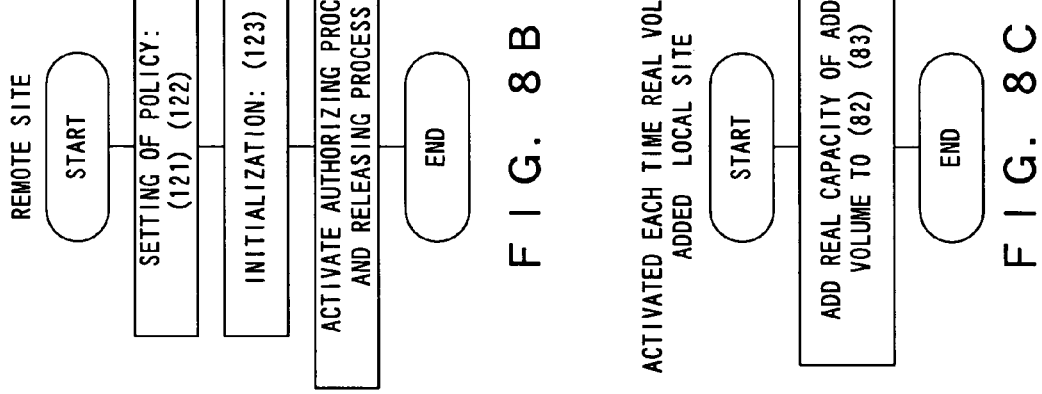
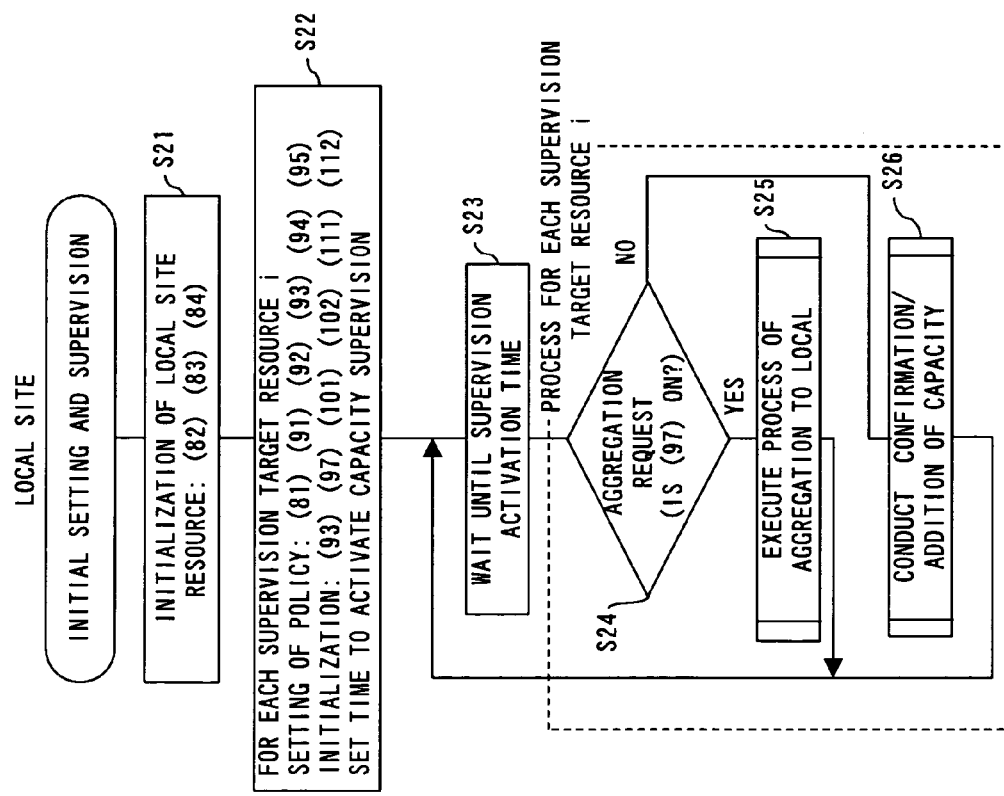

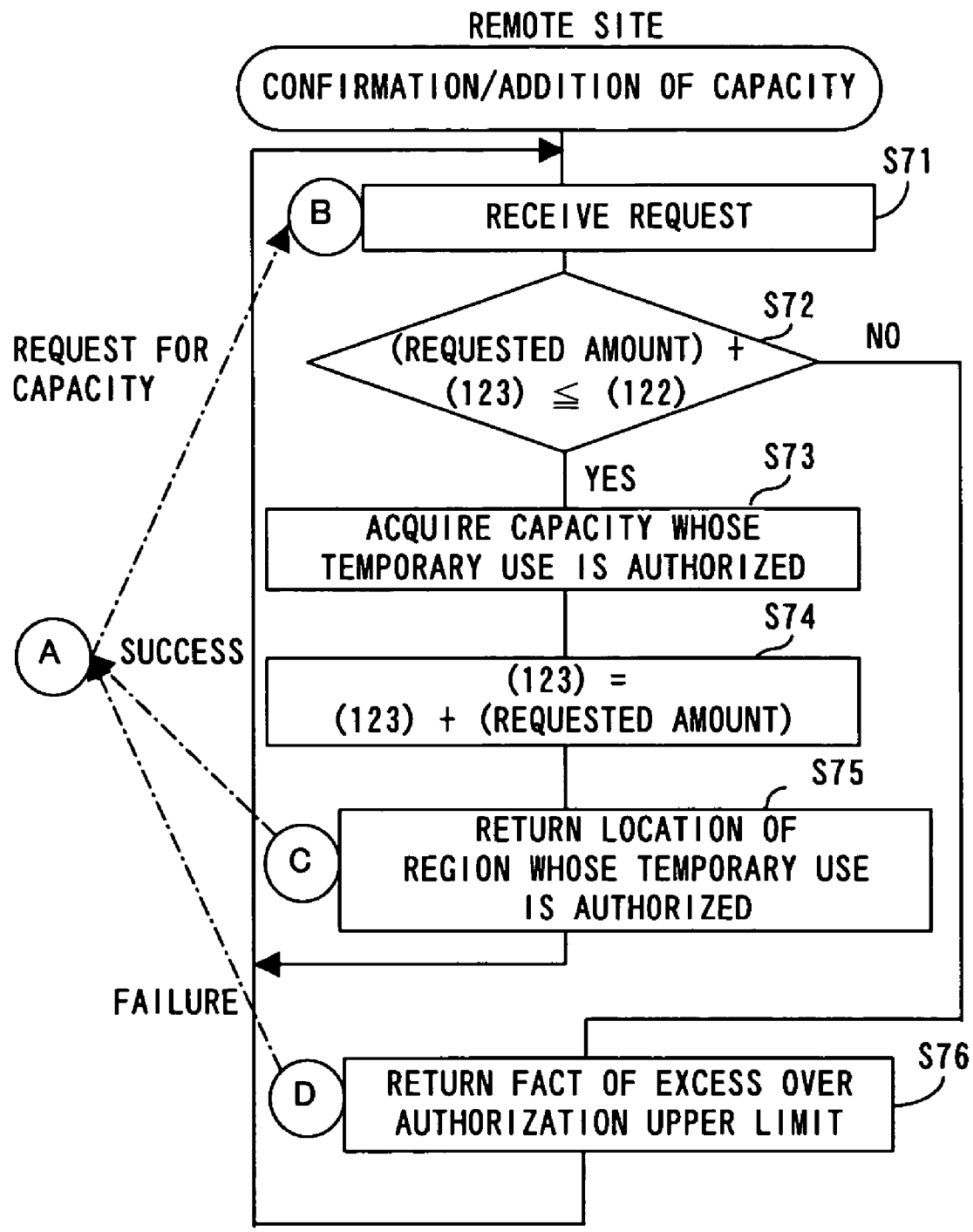
F I G. 9 B

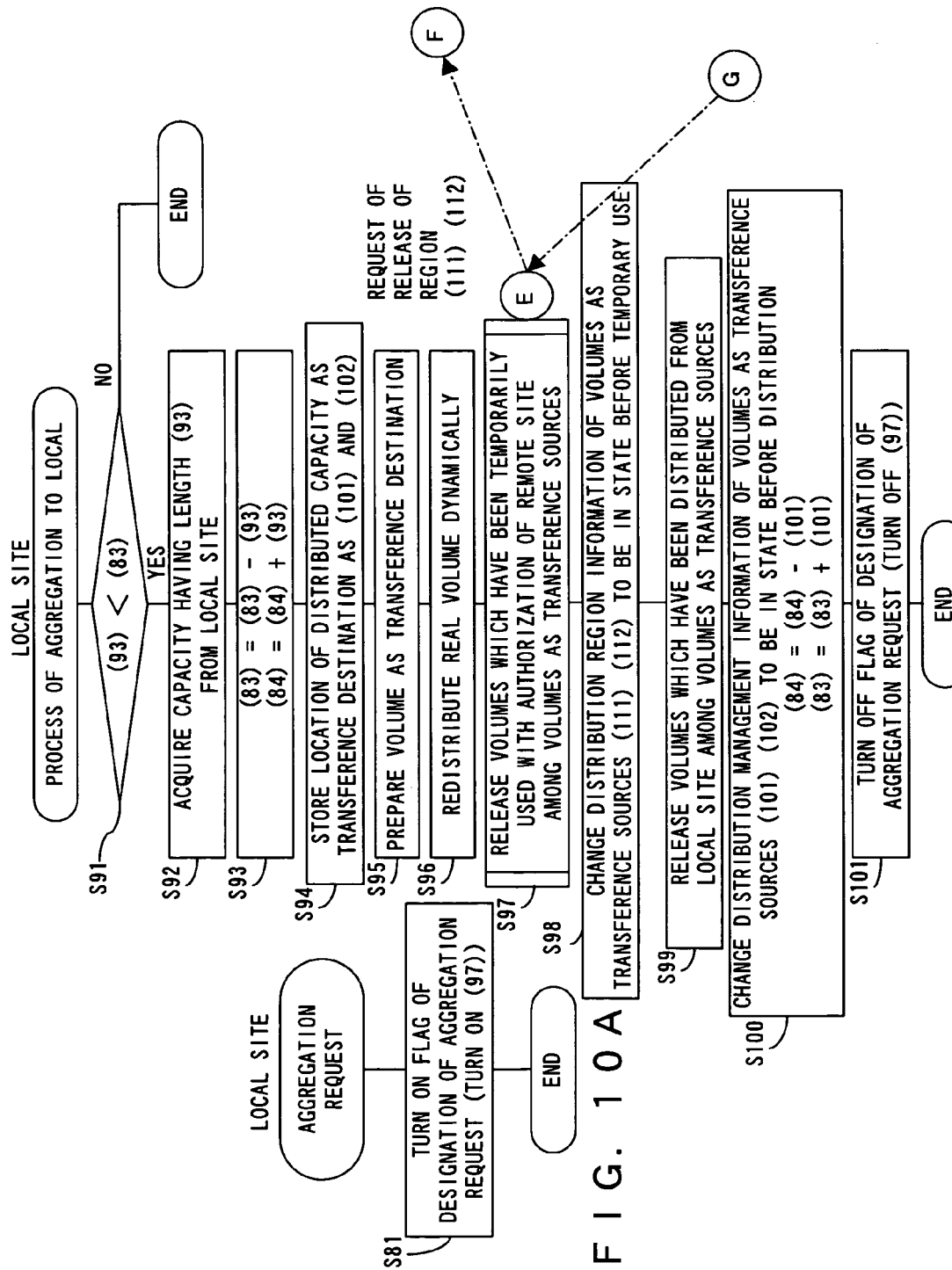

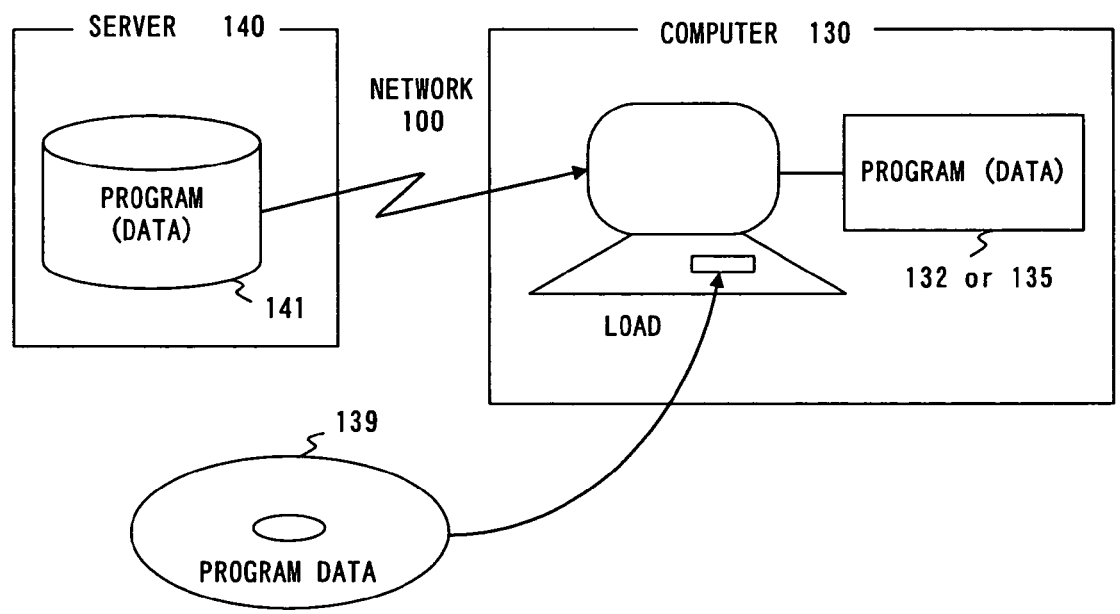
F I G. 1 2

METHOD OF MANAGING STORAGE CAPACITY, SERVER AND RECORDING MEDIUM THEREFOR

CROSS REFERENCE TO RELATED APPLICATION

This application is a continuation of international PCT application No. PCT/JP2003/008224 filed on Jun. 27, 2003.

BACKGROUND OF THE INVENTION

1. Field of the Invention

The present invention relates to a system in which storage virtualization is implemented in a storage network, and particularly to a management method or the like of automatically conducting distribution and addition of capacity to respective information processing resources.

2. Description of the Related Art

In recent years, networking and intelligentization have proceeded in a technical field of storage based on a technique of storage networking. The storage unit, has become independent of a server platform, and is now evolving into an independent computing platform.

As such techniques for the storage network, SAN (Storage Area Network), NAS (Network Attached Storage) and the like are conventionally known, for example. The SAN constructs a dedicated network in which servers and storage are connected mainly by using a Fibre Channel technique. The SAN employs a configuration in which servers and storage are connected as the SAN separately from LAN which connects clients and the servers, and a plurality of storage devices are unitarily managed based on a concept that the plurality of the storage devices work as a single system. By causing the storage to be independent of the servers, it is possible to innovate solutions which are independently implemented in the storage such as data preservation by disk mirror, LAN free/serverless backup and disaster recovery. A network which is flexible and highly extendable similarly to a LAN can be constructed by using hubs and switches of the Fibre channel, and the capacity, the management and the like of the storage can be enhanced.

The NAS (Network Attached Storage) is a network storage that connects to an IP network in a manner similar to that of a file server connected to the IP network. In the NAS, not only servers but also clients can directly access storage, while in the SAN, the clients can access the storage only via the servers.

Further, in recent years, a technique of storage virtualization in the storage network has been developed. In the conventional SAN (Storage Area Network) and NAS (Network Attached Storage), the storage is physically integrated. To the contrary, in the storage virtualization, the storage is logically integrated.

In the above SAN, the storage is separated from and made independent of servers, and all the files are physically aggregated. However, stored data constituting the SAN is still closely associated with the OS and applications of the servers logically. The stored data of various servers exists at one location physically, however, the data is not integrated as one unit of management logically at all. To enhance the function of the SAN, the storage network requires a configuration where the stored data is also independent of servers logically, and the data can be unitarily controlled and managed on the side of the storage device physically and logically. The technique to meet the above requirement is the storage virtualization technique.

In the storage virtualization, a logical view viewed from the OS or an application in a server is separated from physical implementation in the storage. In other words, a manner in which the storage appears when it is viewed from outside is separated from physical existence of the storage. Disks themselves have been subjected to virtualization for a long time. The realization of virtualization at an individual disk device level such as block distribution of cylinders, tracks or disks based on RAID techniques has lead to a realization of mirroring and striping at a hardware level. In the storage virtualization technique, similar processes are realized in the entirety of the storage network.

Regarding the virtualization, virtual memory (a paging process and a swapping process) is very well known, however, as described above, the storage virtualization is completely different from the technique of virtual memory. Therefore, the inventions related to virtual memory (the paging process and/or the swapping process) disclosed, for example, in Patent Document 1, Patent Document 2, Patent Document 3 and the like are made in the technical field having no relationship to that of the present invention.

In the above storage virtualization technique, functions explained in FIG. 13 to FIG. 18 have already been able to be utilized. Specifically, the function of "virtualization of volume" explained in FIG. 13 and FIG. 14, the function of "switching between virtualization and non-virtualization of volume" explained in FIG. 15, the function of "dynamic capacity addition of volume" explained in FIG. 16, the function of "mirroring of user data" explained in FIG. 17, and the function of "dynamic redistribution of real volume" explained in FIG. 18. Also, a technique of SCSI access via an IP (iSCSI) has been known in recent years. These conventional techniques are disclosed in Non-Patent Document 1, Non-Patent Document 2, Non-Patent Document 3, Non-Patent Document 4 and Non-Patent Document 5 and the like. Further, products provided with these functions have already been sold (IPStor and the like for example). Additionally, the details of the IPStor are introduced in a website of Non-Patent Document 6 for example.

The function of "virtualization of volume" shown in FIG. 13 is very well known in the technique of the storage virtualization, however it will be explained for a confirmation. In the function of "virtualization of volume", volume which is visible from a host 200 is abstracted as a virtual volume, and a location at which data corresponding to this virtual volume actually exists and the data's configuration are invisible from the host 200. Accordingly, one virtual volume V1 that is visible from the host 200 (2 GB for example) may actually consist of two real volumes R1 and R2 (each 1 GB for example) as shown in FIG. 13. Naturally, the inverse case is possible. Also, the correspondence or the like between the virtual volume and the real volume is unitarily managed by a virtualization server (not shown) based on management information stored therein, and the host 200 acquires arbitrary data or and the like via the virtualization server when the data is necessary. Additionally, the configuration of the virtualization server is not limited to one independent server, and for example, the host 200 itself can include a function of the virtualization server for accessing the storage via the virtualization server function by means of an application or the like.

Additionally, the management information specifying the correspondence between the virtual volume and the real volume can be held in the real volumes R1, R2 and R3 which store user data as shown in FIG. 14A for example, or can be unitarily held in a volume 220 which is different from any one of the real volumes R1, R2 and R3 storing the user data as shown in FIG. 14B.

Next, the above function of "switching between virtualization and non-virtualization of volume" will be explained. According to this function, as shown in FIG. 15, the user data on the real volume R1 can be located, as it is, under the virtualization control and be used without being transferred to another volume (without being copied) (upon this, the correspondence between the virtual volume V1 and the real volume R1 is registered in the management information 220), and in an inverse manner, the user data can be returned to be in the state of non-virtualization from the state of the virtualization.

Next, the above function of "dynamic capacity addition of volume" will be explained.

When capacity of a real volume is to be added while the real volume is being directly used by a host, the host has to stop its operation and wait for a restart of the operation until a real volume having necessary capacity is prepared and user data is copied onto this prepared volume. However, when the virtual volume is used, the capacity can be added without stopping the operation of the host. An image of the above is shown in FIG. 16. In FIG. 16, an image is shown in which first, the capacity of the virtual volume V1 was only the capacity of volume V1-1 corresponding to the real volume R1, and later, the capacity of volumes V1-2, V1-3 and V1-4 respectively corresponding to the real volumes R2, R3 and R4 is dynamically and sequentially added for example. In FIG. 16, for example, a virtualization server 230 holds management data 231 specifying the correspondence between the virtual volume and the real volume for controlling the virtualization, and upon the above addition of the capacity, the correspondence between the real volumes R2, R3 and R4 and the virtual volume V1 (V1-2, V1-3 and V1-4) is newly registered in the management data 231.

Next, the above function of "mirroring of user data" will be explained.

As is well known, in the storage virtualization, mirroring can be configured. Specifically, a real volume which is in a state of storage virtualization as shown in FIG. 17A is duplicated into two real volumes R1 and R5 which correspond to one virtual volume V1 which is visible from the host 200 and the exact same data 1 is stored in the two real volumes R1 and R5 as shown in FIG. 17B, thereby, even when one real volume has a fault, the operation of the host does not have to stop by depending on the other real volume.

Next, the above function of "dynamic redistribution of real volume" will be explained.

In this function, one existent real volume as shown in FIG. 18A is once duplicated by adding a new real volume R5 besides one real volume R1 corresponding to one virtual volume V1 based on the above mirroring function, and the data 1 existing in the real volume R1 is copied onto the added real volume R5 as shown in FIG. 18B. Then, as shown in FIG. 18C, the existent real volume R1 is separated, and only the added real volume R5 is made to correspond to the virtual volume V1. Naturally, this change of the location at which the user data 1 is actually stored is invisible from the host 200. According to the above configuration, the actual location at which the user data 1 actually exists (the real volume) can be changed without stopping the operation of the host 200.

Next, the technique of SCSI access via an IP (iSCSI) will be explained.

The above described SAN has a lot of merits, however, the SAN has a problem of high cost because the SAN is based on Fibre Channel which is a relatively new technology. Also, there is a maximum connection distance limit of 10 kilometers. The technique which is developed taking these demerits into consideration is IP-SAN (Internet Protocol-SAN) whose representative example is the iSCSI.

The iSCSI (Internet Small Computer Systems Interface) generally means a protocol standard for conducting data communications between computers and storage on the IP network by using the SCSI command encapsulated in an IP packet, about which draft of standard is currently released by IETF (Internet Engineering Task Force) and the standardization thereof is in progress.

The iSCSI is characteristic in that it can deal with the network storage while maintaining a compatibility with the existing applications by employing SCSI command which is commonly used in storage devices.

In the conventional SCSI, a physical transmission channel is defined together with commands for various controls and data transference, however, in the iSCSI, command portions in the SCSI are extracted and the IP network is employed for transmission channel so that the versatility is enhanced. By employing the iSCSI, servers and storage can be connected by using switching hubs, routers and the like for Ethernet which are inexpensive instead of the Fibre channel which is commonly used as a transmission channel for the SAN. Further, because the IP network is employed for the transmission channel, the iSCSI can be applied to an application in which the data is backed up in a remote storage by using the Internet.

As above, in the iSCSI, the standardization is in progress in which the merits of the existing SCSI technique and the IP/Ethernet techniques are utilized, and the server/storage industries hold expectations for the iSCSI as a new standard of storage protocol.

The configuration example where the iSCSI is employed is shown in FIG. 19. In FIG. 19, an arbitrary transaction server 250 in a local site 240 comprises a SCSI driver 252, a NIC (LAN) driver 253, and when an arbitrary transaction program 251 issues SCSI data including commands such as connection, disconnection, information acquisition, reading, writing or the like, the SCSI data is encapsulated in an IP packet, and is transmitted to a remote site 260. As shown, the packet based on the iSCSI protocol consists of an IP header portion and a data portion similarly to the packet configuration based on the conventional IP communications protocol, and the SCSI data issued by the above transaction program 251 is integrated in this data portion.

On a side of the remote site 260, a virtualization server 270 or the like comprising a NIC (LAN) driver 271, a SCSI driver 272 converts the received iSCSI data into the SCSI data, executes a process on the real volume 280 in accordance with the requesting command, and returns to the local site 240 (for example, when the command requests data reading, the requested data is read and the read data is returned to the local site 240).

Incidentally, in recent years, due to a rapid spread of the Internet and a rapid increase in the number of cases where a large amount of data such as still images, video images and the like is transmitted, the data amount required to be transmitted has rapidly increased in the computer network market, and occasions for additionally installing data storage devices for storing the large amount of data as above occur much more often. It is possible that data storage device for storing the large amount of data is provided from the beginning, however such a provision increases cost. In addition, a technique of a timely preparation of capacity for a sudden requirement of the capacity, in other words, so called storage on demand is desired.

Regarding the above increase/addition of the storage capacity, inventions are supposed, for example, in the Patent Documents 4, 5, 6, and 7.

An invention disclosed in the Patent Document 4 is a method in which an extension of capacity of logical devices or increase of the number of the logical devices accompanying the extension of capacity of external storage devices can be accurately conducted on-line in an information processing system including external storage devices respectively in a primary system and a secondary system. This technique is based on an assumption that the capacity of the external storage devices has already been extended, and does not relate to a technique for managing and controlling the capacity extension of the external storage devices (real volume) themselves.

An invention disclosed in the Patent Document 5 realizes a reduction of initial investment for data storage devices and an easy addition of capacity in the data storage devices. The addition of capacity in this invention, however, is a technique in which the data storage device at a user location is provided beforehand with a disk device (additional capacity) having a capacity larger than the user's initial requirement so that the user can easily extend a usable region within a range of the above additional capacity which is provided beforehand as shown in FIG. 1 of the Patent Document 5 for example. Therefore, this invention does not relate to a technique for physically increasing capacity of the data storage device in a site of a user.

The invention described in the Patent Document 6 is an invention that realizes an easy virtual extension of capacity of an auxiliary storage device for a personal computer. However, the extension of the capacity in this invention means a solution for a lack of capacity in which when the personal computer lacks available capacity, old files are transferred to a file server, and the transferred files are deleted for preparing the available capacity in the personal computer in order to solve the lack of capacity. Therefore, this extension is only a subsidiary extension of the capacity, and brings about an extra process burden of finding, transferring and deleting old files each time the personal computer lacks capacity. Also, when the file server lacks capacity as well as the personal computer, this situation is dealt with by using another file server, however this process brings about the extra process burden of transferring the data to the above another file server. Further, when the lack of capacity can not be dealt with even by all the servers in the site (the servers connected via the LAN), this situation can not be solved. Still further, in this invention, the only unit of processing of data is a file so that this invention can not be applied for processing the used region of a database management system for example, although this invention can be applied to a file system.

An invention described in the Patent Document 7 is an invention which relates to a rental service of storage. By this service, a user uses capacity of storage in a storage service provider (SSP) site for a prescribed period (one month for example) based on a contract and pays a fee instead of preparing the storage by himself/herself. The invention described in the Patent Document 7 relates to the rental service of the storage such as the above, in which the storage provider prospects use an amount in the future based on past use amount of the storage by the user of the storage, and notifies prospect result to the user of the storage. The user of the storage can modify the contract content to a suitable content by extending or reducing data amount to be used based on this notification in order to receive the rental service.

In the above rental service of the storage, the user pays a rental fee for the storage which the storage provider rents to him/her, instead of preparing the storage. When the capacity of the storage to be used is very large, a large amount of rental fee is needed.

Also, in the above described conventional techniques, burden of manpower is great because an administrator or the like has to determine the lack of capacity and to instruct extension/reduction of capacity (addition/reduction of capacity).

Considering the above, it is desired that the lack of capacity is dealt with by distributing the capacity which is needed at each moment to respective information processing resources (for example, databases, file systems and the like) in a site basically by using storage included in the site itself, and when the lack of capacity can not be dealt with even when all the storage in the above site itself are used, the storage in external servers are used, and thereafter released when the above storage in the external servers becomes unnecessary, and further that these processes are automatically executed by a computer.

Patent Document 1
   Japanese Patent Application Publication No. Hei11-15732

Patent Document 2
   Japanese Patent Application Publication No. Hei10-40169

Patent Document 3
   Japanese Patent Application Publication No. Hei6-19796

Patent Document 4
   Japanese Patent Application Publication No. Hei8-241220

Patent Document 5
   Japanese Patent Application Publication No. 2002-312689

Patent Document 6
   Japanese Patent Application Publication No. Hei9-185536

Patent Document 7
   Japanese Patent Application Publication No. 2002-312699

Non-Patent Document 1
   NETWORK WORLD, September issue 2002, p154-157

Non-Patent Document 2
   DATA STORAGE REPORT 2002 as the separate volume of COMPUTOPIA, published by Computer Age. Co., Ltd, p21, 22, 23, 34, 38 and 39

Non-Patent Document 3
   STORAGE IN PROGRESS (First part) on NIKKEI COMPUTER on May 6, 2002, p134-141

Non-Patent Document 4
   STORAGE NETWORKING VIRTUALIZATION written by Gen Negoro and included in UNISYS TECHNOLOGY REVIEW 74$^{th}$ issue, August 2002

Non-Patent Document 5
   "SNIA Virtualization Tutorial" which can be downloaded at http://www.snia.org/education/tutorials/virtualization/

Non-Patent Document 6
   http://www.falconstor.co.jp/products/competitive/

SUMMARY OF THE INVENTION

It is an object of the present invention to provide a method of managing storage capacity, a server and a recording medium therefore in which processes are automatically executed where necessary capacity is distributed to respective information processing resources in a site at any time by storage virtualization of real volumes in the site itself, and when a lack of capacity can not be dealt with only by the real volumes in the above site itself (lack of the real volumes), the real volumes in external servers are temporarily put into service and released when the real volumes in the above external servers become unnecessary.

A server for executing a method of managing storage capacity according to the present invention is configured to be a server in a site in which storage virtualization is implemented comprising capacity management information storage unit for storing therein available real capacity in an entirety of real volumes in the unit's own site and capacity distribution information for each supervision target resource in the unit's own site, and capacity distribution control unit's for distributing additional capacity to a supervision target resource whose current available capacity has become less than a predetermined threshold value by using real volumes in the unit's own site when the real volumes in the unit's own site can deal with in accordance with available real capacity in an entirety of the real volumes in the unit's own site, and for distributing additional capacity to the supervision target resource by temporarily using real volumes in another site when the real volumes in the unit's own site can not deal with.

First, in the above unit's own site, the conventional storage virtualization is implemented.

Next, the above capacity distribution control unit supervises available capacity of each information processing resource (transaction server or the like for example) in the unit's own site, and determines necessity of capacity addition by utilizing a prescribed threshold value or the like which is set beforehand. Then, when the capacity distribution control unit determines that the capacity addition is necessary, the capacity distribution control unit distributes necessary capacity to the corresponding information processing resource basically by using real volumes in the unit's own site. Even when the real volume in the unit's own site can not deal with the above situation, the situation can be dealt with by temporarily using real volumes in another site.

Also, it is possible that the above server is configured to further comprise aggregation unit for aggregating data stored in the real volumes in said another site to an available region in the unit's own site and for releasing the real volumes in said another site, when an available region can be secured in real volumes in the unit's own site after the temporary use of the real volumes in said another site.

In other words, even when the site temporarily lacks capacity for example, temporarily used real volumes are released when the temporary use of volumes in another site becomes no longer necessary due to the reason that the lack of capacity in the unit's own site is solved or the like. As above, the lack of capacity can be dealt with flexibly by a temporary use and a release as occasion demands. Further, this example does not mean that only the unit's own site temporarily uses, and only another site authorizes the temporary use, and a configuration is possible in which each site temporarily uses and authorizes the volumes. Thereby, each site can authorize the temporary use of the volumes when it has extra available capacity, and can temporarily use the volumes when it does not have the extra available capacity so that each site does not have to prepare extra available capacity in a large amount.

Also, for example, the above capacity distribution control unit can distribute additional capacity to the above supervision target resource by executing the function of "dynamic capacity addition of volume" based on the above storage virtualization.

Also, for example, the above aggregation unit can aggregate the data to the available region by executing the function of "dynamic redistribution of real volume" in which volumes are temporarily put in a mirrored state by the virtualization control based on the storage virtualization.

Also, for example, the above temporarily used real volumes in another site are accessed by using a SCSI protocol which utilizes an IP. As explained for the conventional technique, various merits can be obtained by employing the iSCSI.

Further, the above processes are almost completely automatically executed so that an administrator or the like does not have to supervise conditions regarding available capacity of each information processing resource for giving instructions of increase/decrease of capacity, which leads to reduction of burden of manpower. Further, as described in conventional technique, in the case where real volumes in another site are temporarily used, usually a rental fee is charged in accordance with use period, however, in the method according to the present example, the temporarily used volumes are automatically released when the temporarily used volumes become unnecessary so that the volumes can be temporarily used only for the really necessary period. Accordingly, temporary use for an unnecessarily long period that leads to a high cost can be avoided. In other words, the present example can also bring about an effect of reduction of cost for the storage rental fee.

BRIEF DESCRIPTION OF THE DRAWINGS

FIG. 7A shows an example of management data used by a virtualization server on the side of the local site such as temporary use destination, temporary use capacity and the like;

FIG. 7B shows an example of management data used by a virtualization server on a side of a remote site such as authorizing destination, authorized capacity and the like;

FIG. 8A is a flowchart for showing an initial setting and supervision process by the virtualization server on the side of the local site;

FIG. 8B is a flowchart for showing processes executed by the virtualization server on the side of the remote site;

FIG. 8C is a flowchart for showing a process executed by the virtualization server when real volumes are added on the side of the local site;

FIG. 9B is a detailed flowchart of authorization process among processes in step S33 in the case where request for capacity addition is made in the processes in FIG. 9A;

FIG. 10A shows a process of turning on a flag of designation of local aggregation;

FIG. 10B is a detailed flowchart of a local aggregation process in a step S25;

FIG. 12 shows an example of a recording medium that has recorded a program and downloading of the program;

DESCRIPTION OF THE PREFERRED EMBODIMENTS

Figure 1:
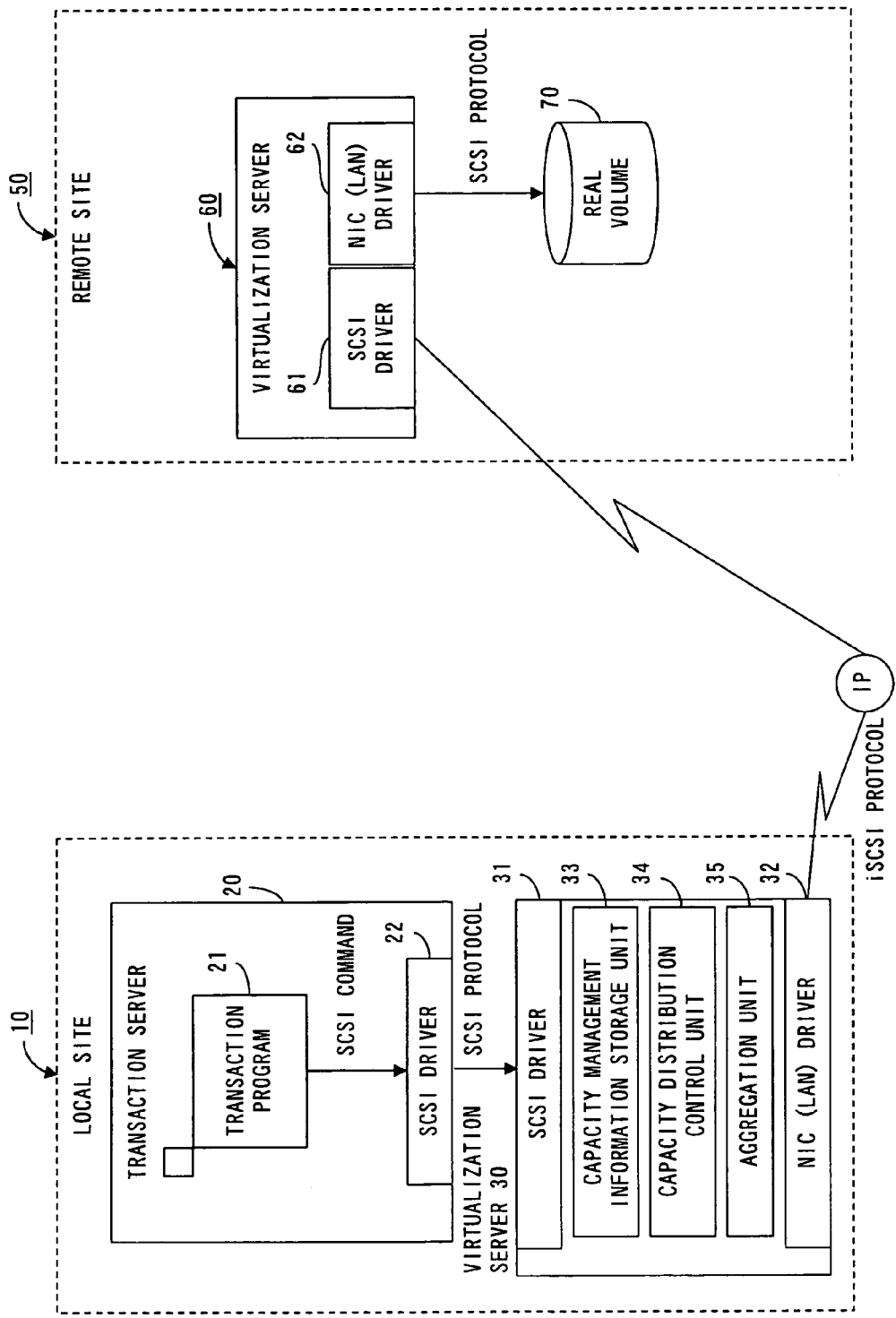
FIG. 1 is a schematic configuration diagram of an entirety of a system for realizing a method of managing storage capacity according to an embodiment of the present invention.

Hereinafter, embodiments of the present invention will be explained by referring to the drawings.

First, the term "volume" (real volume and virtual volume) will be explained.

Generally, an address used for input/output request in SCSI consists of a target port number, a logical unit number and a block number. The target port number is an identification number incorporated in a chip of a port, which is called World Wide Name. As the logical unit number, at most two hundred and fifty six numbers can be designated for one port at present. The block numbers are assigned to respective blocks with a fixed length which constitute the unit. The above "volume" relates to the logical unit number, and the real volume means the above LU (logical unit) assigned the above logical unit number. The logical unit which is virtualized is the virtual volume (also referred to as virtual LU).

FIG. 1 is a schematic configuration diagram of an entirety of a system for realizing a method of managing storage capacity according to the present embodiment.

In FIG. 1, a local site 10 is an arbitrary site, and a remote site 50 is another site for supplying capacity when the side of the local site 10 lacks capacity.

In the local server 10, the above conventional storage network is virtualized in the above conventional storage virtualization manner, and the storage in the local site 10 is managed by a virtualization server 30. Various application servers in the local site 10 (a transaction server 20 in FIG. 1 for example) access to the virtualization server 30 in accordance with a SCSI protocol. Both of the transaction server 20 and the virtualization server 30 include SCSI drivers 22 and 31. When arbitrary data has to be accessed (for example, read/write or the like) as a result of execution of an arbitrary transaction program 21 in the transaction server 20, storage is accessed via the virtualization server 30.

The virtualization server 30 conducts a virtualization control by managing respective storage in accordance with the conventional technique. The virtualization server 30 further comprises a NIC (LAN) driver 32. The NIC (LAN) driver 32 is connected to a LAN (not shown), and accesses to another site (remote site 50) by using the iSCSI protocol.

Also, the virtualization server 30 comprises a capacity management information storage unit 33, a capacity distribution control unit 34 and an aggregation unit 35.

The capacity management information storage unit 33 stores at least available real capacity in the entirety of the real volume in the unit's own site (local site 10) and current capacity distribution information for each supervision target resource in the unit's own site.

By referring to data stored in the capacity management information storage unit 33, the capacity distribution control unit 34 distributes additional capacity to a supervision target resource whose current available capacity has become less than a prescribed threshold value by using the real volumes in the unit's own site in accordance with the entire amount of available real volumes in the unit's own site when the real volumes in the unit's own site can deal with the situation. When the situation can not be dealt with by the real volumes in the unit's own site, the capacity distribution control unit 34 issues a temporary use request to another site (remote site 50) for temporarily using its real volume 70 and controls the distribution of the additional capacity to the supervision target resource. Thereafter, when the volume 70 whose temporary use is authorized, the volume 70 is accessed by using the above iSCSI protocol.

When available capacity can be secured in the real volume in the site of the aggregation unit 35 after the temporary use of the real volume 70 in the above another site, the aggregation unit 35 aggregates data stored in the real volumes in the above another site to the available capacity in the aggregation unit's own site, and releases the real volume 70 of the above another site which has been temporarily used.

Also in the remote site 50, a virtualization server 60 comprising a NIC (LAN) driver 61 and a SCSI driver 62 is provided. The virtualization server 60 manages authorization (supplying) regarding the real volume 70 to the local site 10.

As above, with a configuration in which there are virtualization servers in both of the local site 10 and the remote site 50, the virtualization server manages protocol conversion between the SCSI and the iSCSI, and a relationship between the temporary use and the authorizing the temporary use (supplying) of the real volume (naturally, also the conventional storage virtualization control is conducted).

Additionally, the configuration shown in FIG. 1 is an example, and the present invention is not limited to this example. For example, the configuration is possible in which a host comprises a function of the virtualization server.

Figure 2:
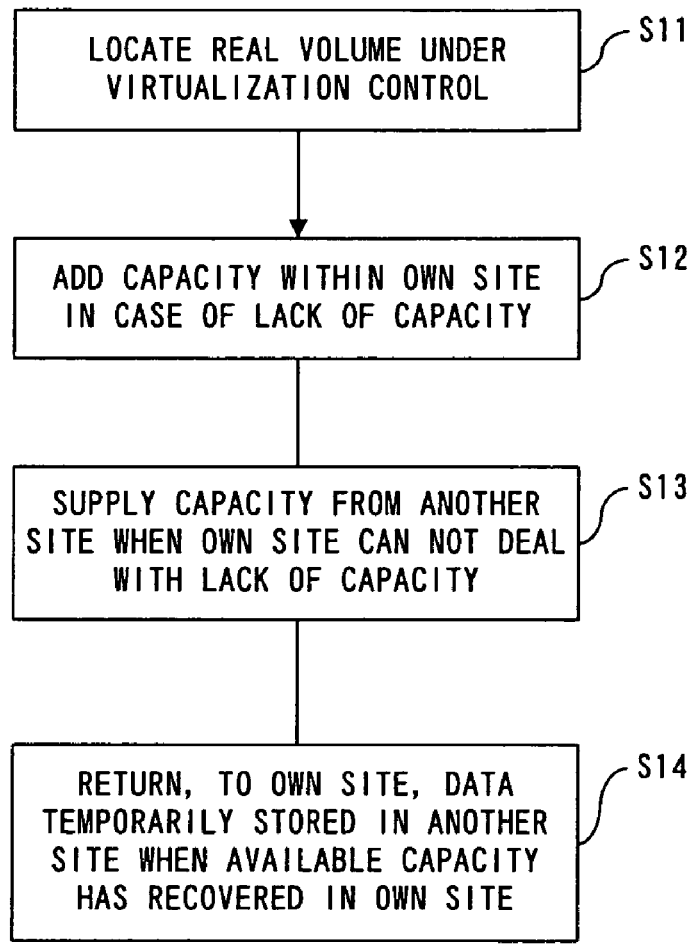
FIG. 2 is a schematic flowchart of entire processes executed by a virtualization server on a side of a local site.

FIG. 2 is a schematic flowchart of all the processes executed by the virtualization server 30 in the local site 10.

In FIG. 2, the virtualization server 30 executes a process of locating the real volume under a virtualization control at an arbitrary timing (step S11) Upon this, by employing the above conventional function of "switching between virtualization and non-virtualization of volume", the real volume can be located under the virtualization control as it is, so that data does not have to be copied for transference to be under the virtualization control. Accordingly, the period of time while which the system can not operate can be reduced. Additionally, the real volume to be processed in the step S11 is the real volume or the like which has a probability of having a sudden lack of capacity for example.

Figure 3:
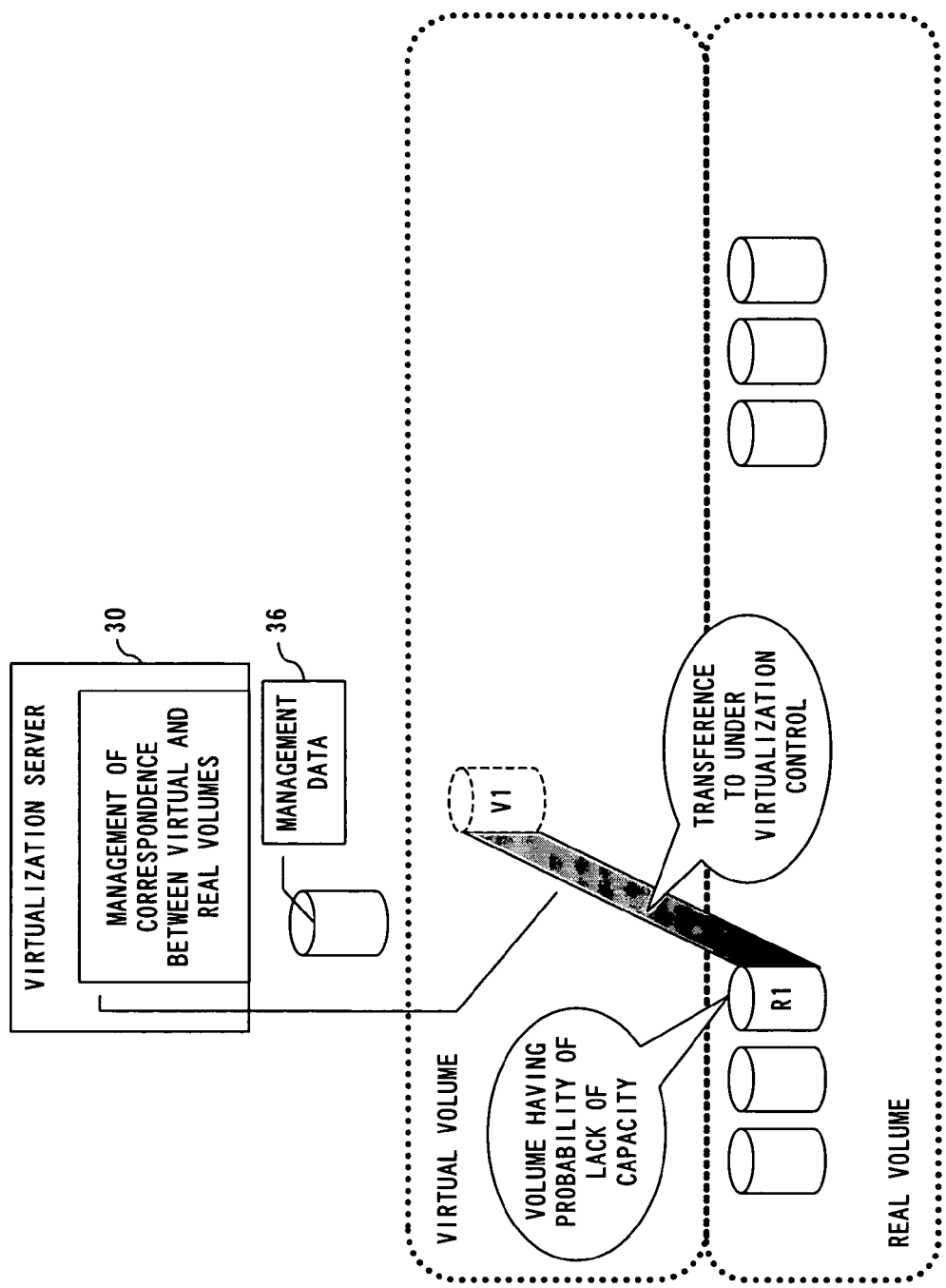
FIG. 3 shows an image of a process in a step S11 in FIG. 2.

FIG. 3 shows an image of the process in the above step S11.

In FIG. 3, the virtualization server 30 manages correspondence between the virtual volume and the real volumes based on management data 36 (virtualization management data). This configuration itself is one of the above conventional techniques, accordingly, an explanation thereof will be omitted. In the process in the step S11, the virtualization server 30 registers, in the management data 36, the correspondence between the real volume R1 which has been newly located under virtualization control and the virtual volume V1.

Thereafter, when distributed capacity to an arbitrary information processing resource has the lack of capacity, the distributed capacity is increased based on the above conventional function of "switching between virtualization and non-virtualization of volume" at an arbitrary timing by using the real volumes in the local site 10 without stopping the operation of the system. Upon this, a process is automatically executed in which it is determined whether or not the above information processing resource has had the lack of the distributed capacity and the distributed capacity is added in accordance with a policy (not shown) regarding the capacity addition under the virtualization control which is beforehand set and stored (for example, the policy specifying that when remaining capacity becomes smaller than 20 (%) of the total capacity, 40 (%) of the total capacity is added) (step S12).

Figure 4:
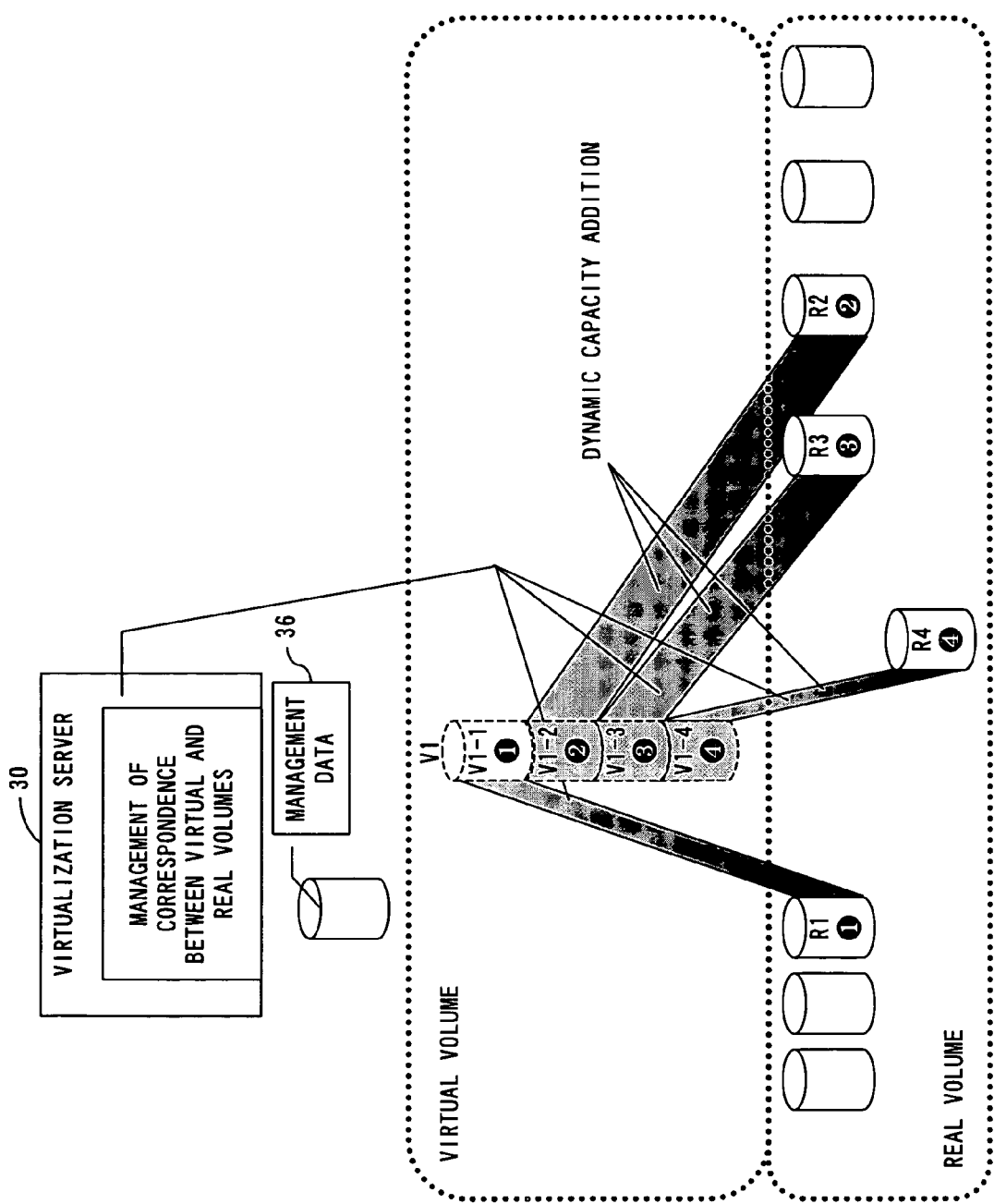
FIG. 4 shows an image of a process in a step S12 in FIG. 2.

FIG. 4 shows an image of the process in the above step S12.

Figure 16:
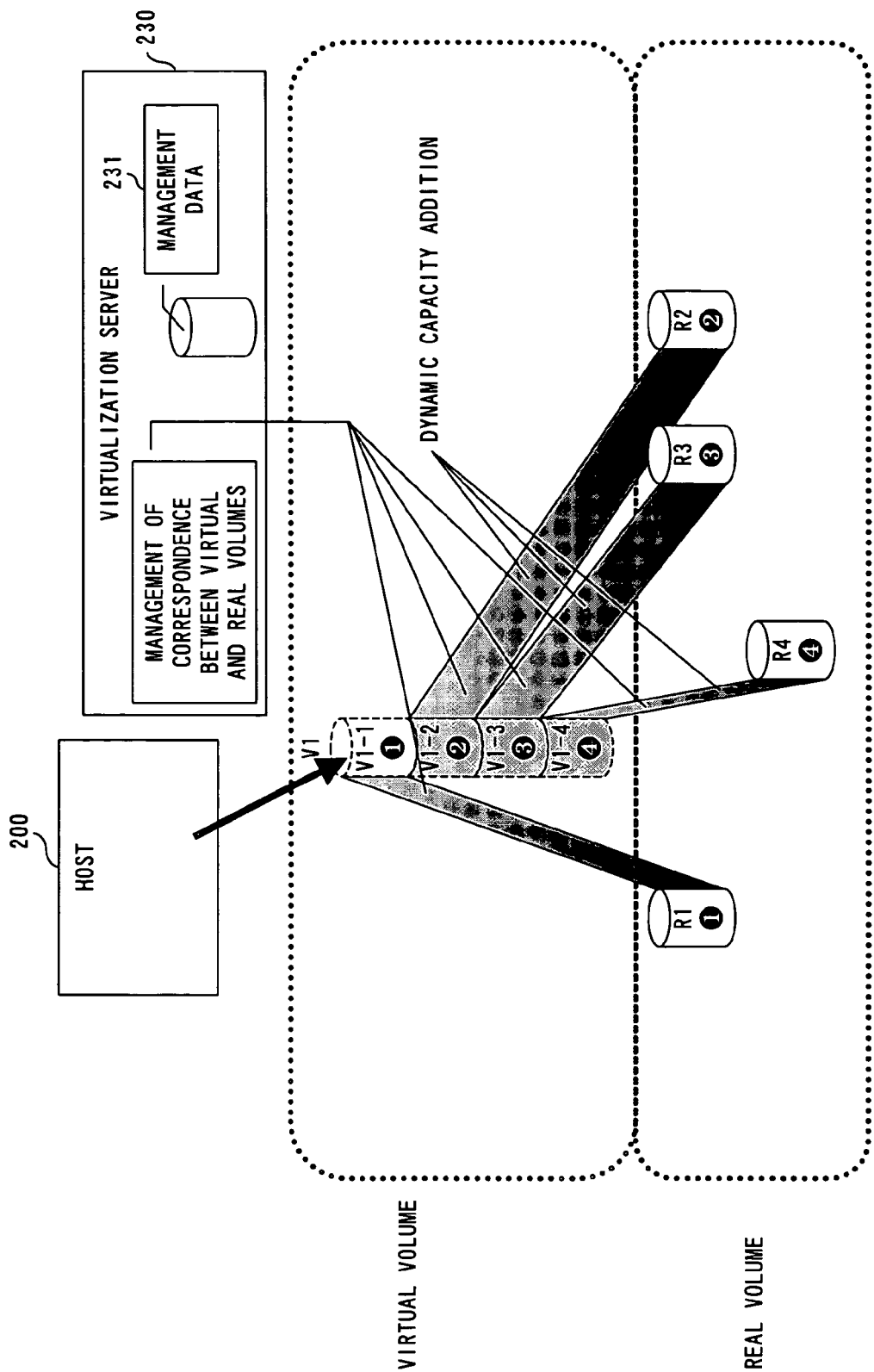
FIG. 16 is a view for explaining a conventional function of "dynamic capacity addition of volume"
Figure 17A:
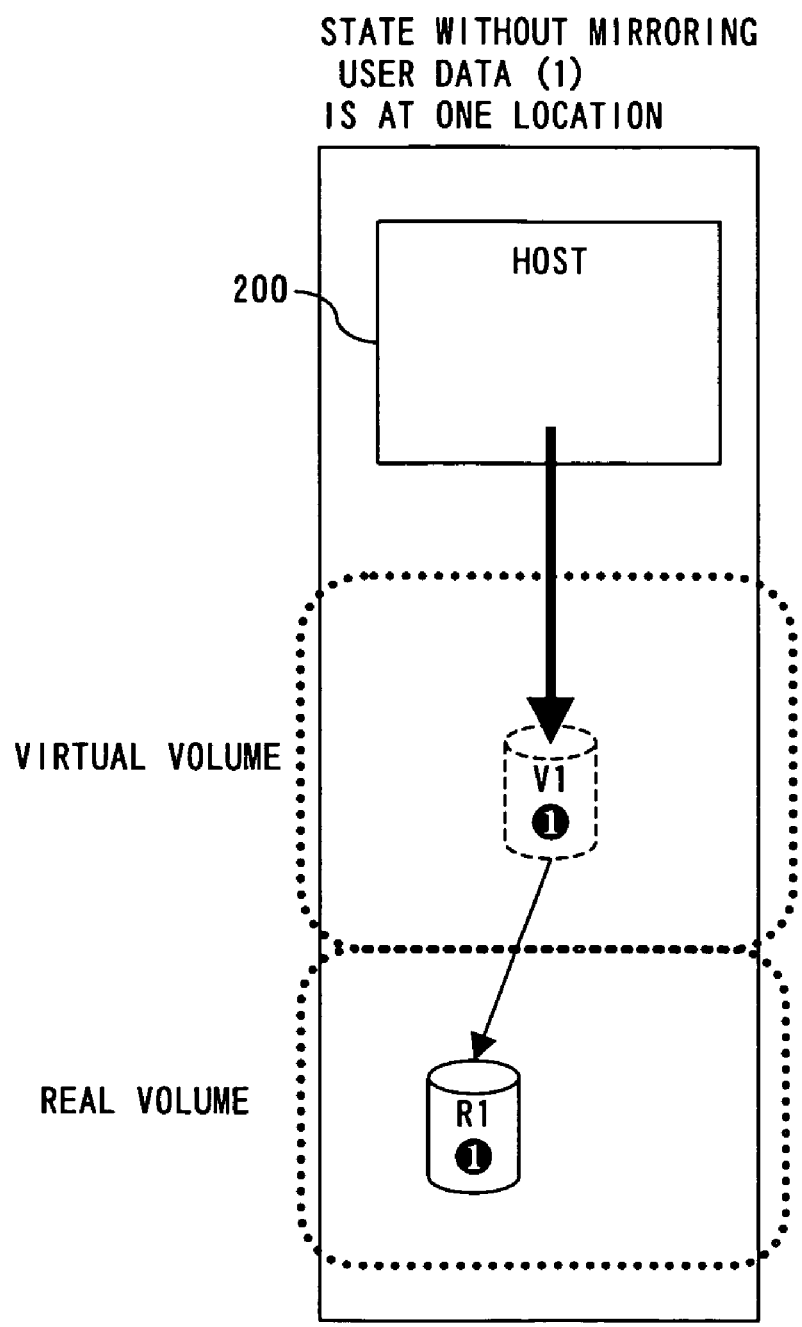
FIGS. 17A and B are views for explaining a conventional function of "mirroring of user data"
Figure 17B:
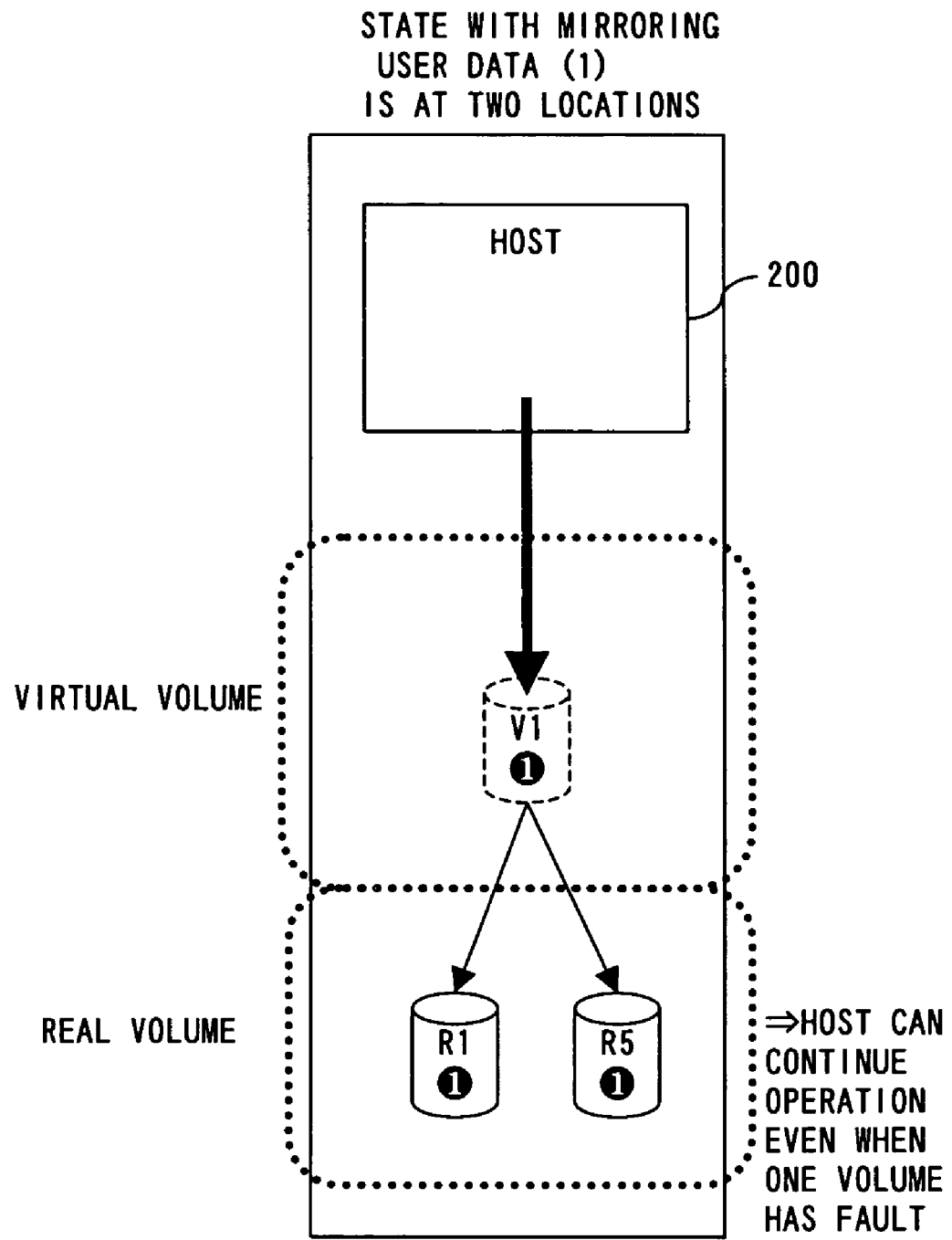

In FIG. 4, the virtualization server 30 controls the storage virtualization based on the management data 36 specifying the correspondence between the virtual volume and the real volumes. Additionally, the process image shown in FIG. 4 is generally the same as that of the conventional technique shown in FIG. 16, accordingly, a detailed explanation will not be given.

In the technique in the present embodiment, the above addition of the distributed capacity can be conducted not only by using the real volumes in the local site 10 but also by temporarily using the real volumes 70 in the remote site 50. Especially, when the addition of the distributed capacity can not be conducted only by the real volumes in the local site 10 (situation of lack of real volume), the situation is dealt with by temporarily using the real volumes 70 in the remote site 50 (step S13). For this purpose, as shown in FIG. 5, the virtualization server 30 on the side of the local site 10 manages the correspondence between the virtual volume and the real volumes, and also manages the capacity distribution to respective information processing resources based on management data 36 (an example thereof is shown in FIG. 7A) taking not only the real volumes in the local site 10 but also the real volumes 70 which have been temporarily used with authorization of the remote site 50 into consideration.

Figure 5:
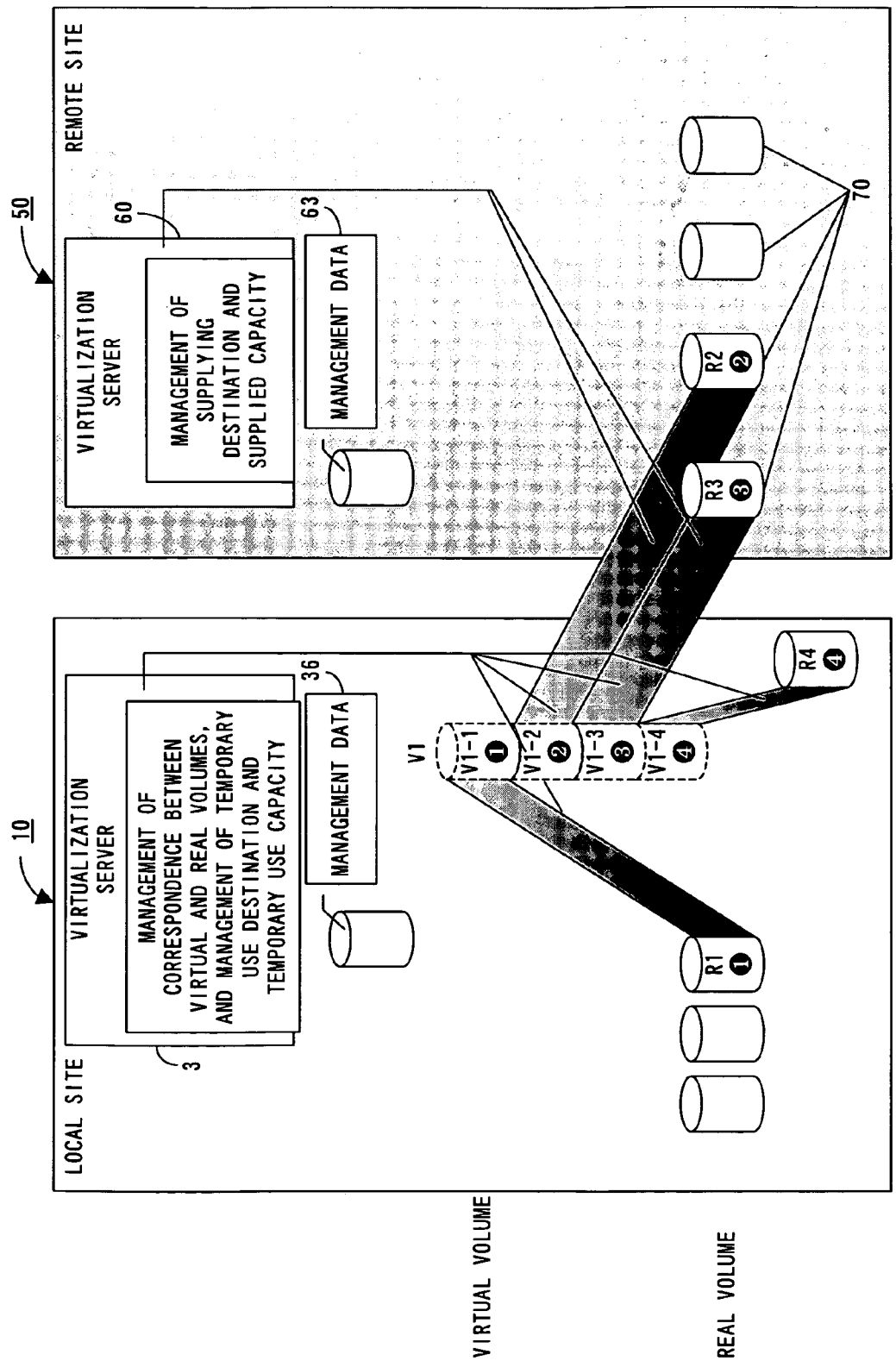
FIG. 5 shows an image of a process in a step S13 in FIG. 2.

In the example shown in FIG. 5, the volumes are managed in a manner where the virtual volumes V1-1 and V1-4 are made to correspond to the real volumes R1 and R4 in the local site 10, and the virtual volumes V1-2 and V1-3 are made to correspond to the real volumes R2 and R3 in the remote site 50. Additionally, numerals such as 1, 2, 3, 4 and the like in the respective volumes in FIG. 5 denote data stored in the corresponding volumes. This can be applied to other views.

The virtualization server 60 on the side of the remote site manages the authorization of the real volumes 70 in the remote site based on management data 63 (an example thereof is shown in FIG. 7B). Additionally, connection for data access between the sites 10 and 50 is realized by the iSCSI protocol.

In addition, the above management data 36 and 63 shown in FIG. 7A and FIG. 7B will be later explained in detail.

The lack of capacity is dealt with by temporarily using the real volumes 70 in the remote site 50 as above, while, when the side of the local site 10 recovers sufficient available capacity, a process is executed in which data which has been temporarily stored on the side of the remote site 50 is aggregated to the side of the local site 10 (step S14). Upon this, the function of "dynamic redistribution of real volume" as one of the above conventional techniques is employed. According to function of "dynamic redistribution of real volume", even data distributed among a plurality of the real volumes 70 in the remote site 50 can be aggregated to the side of the local site 10.

Figure 6:
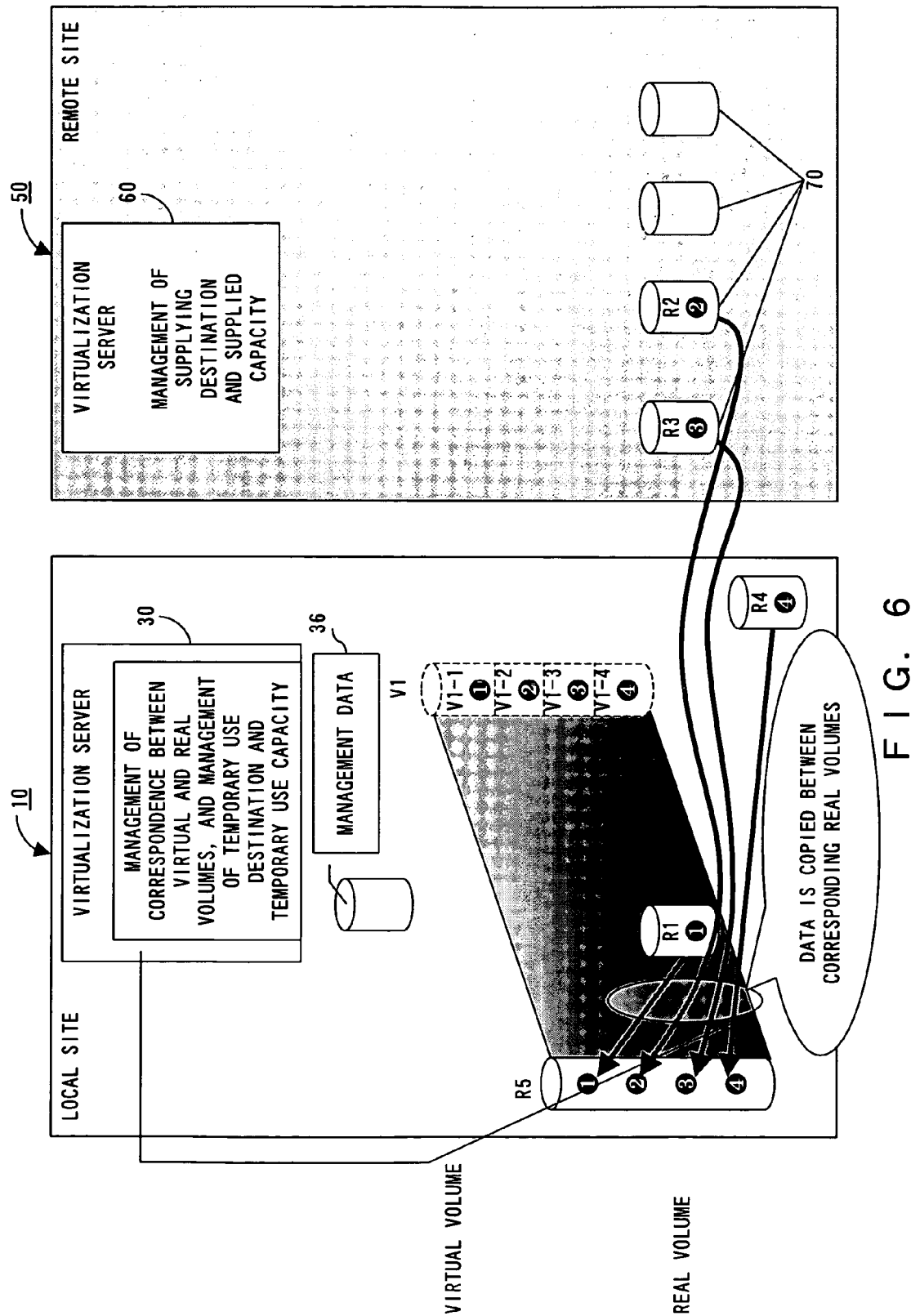
FIG. 6 shows an image of a process in a step S14 in FIG. 2.

FIG. 6 shows an image of the process in the step S14.

Figure 18A:
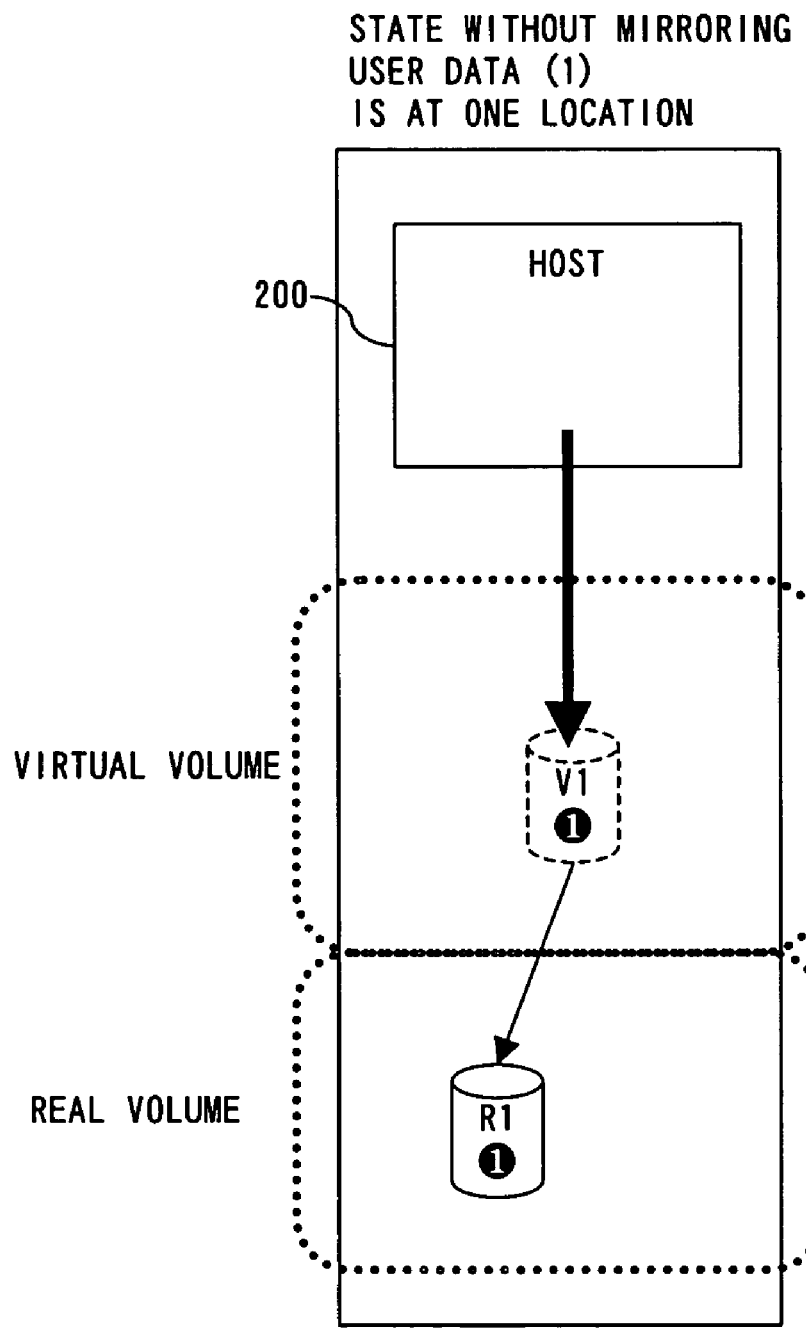
FIG. 18A to C are views for explaining a conventional function of "dynamic redistribution of real volume"
Figure 18B:
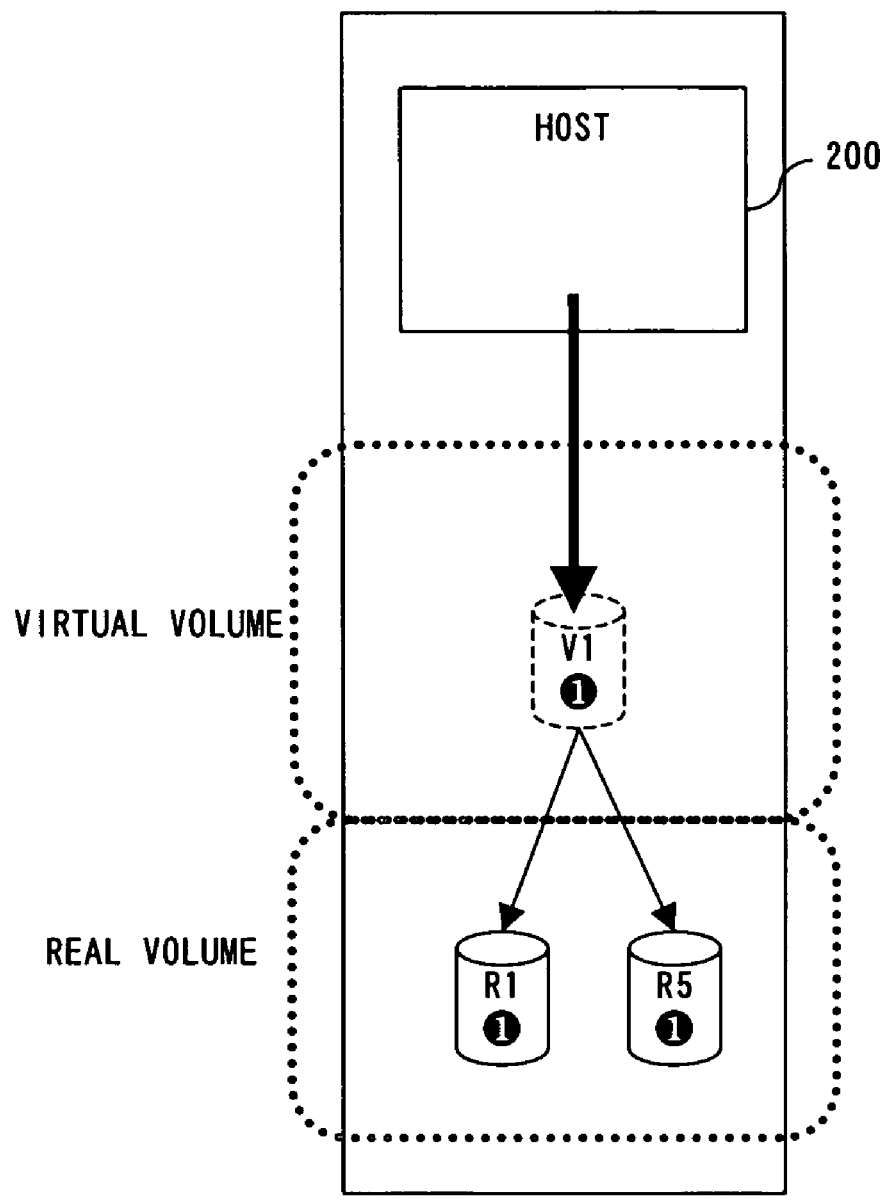
Figure 18C:
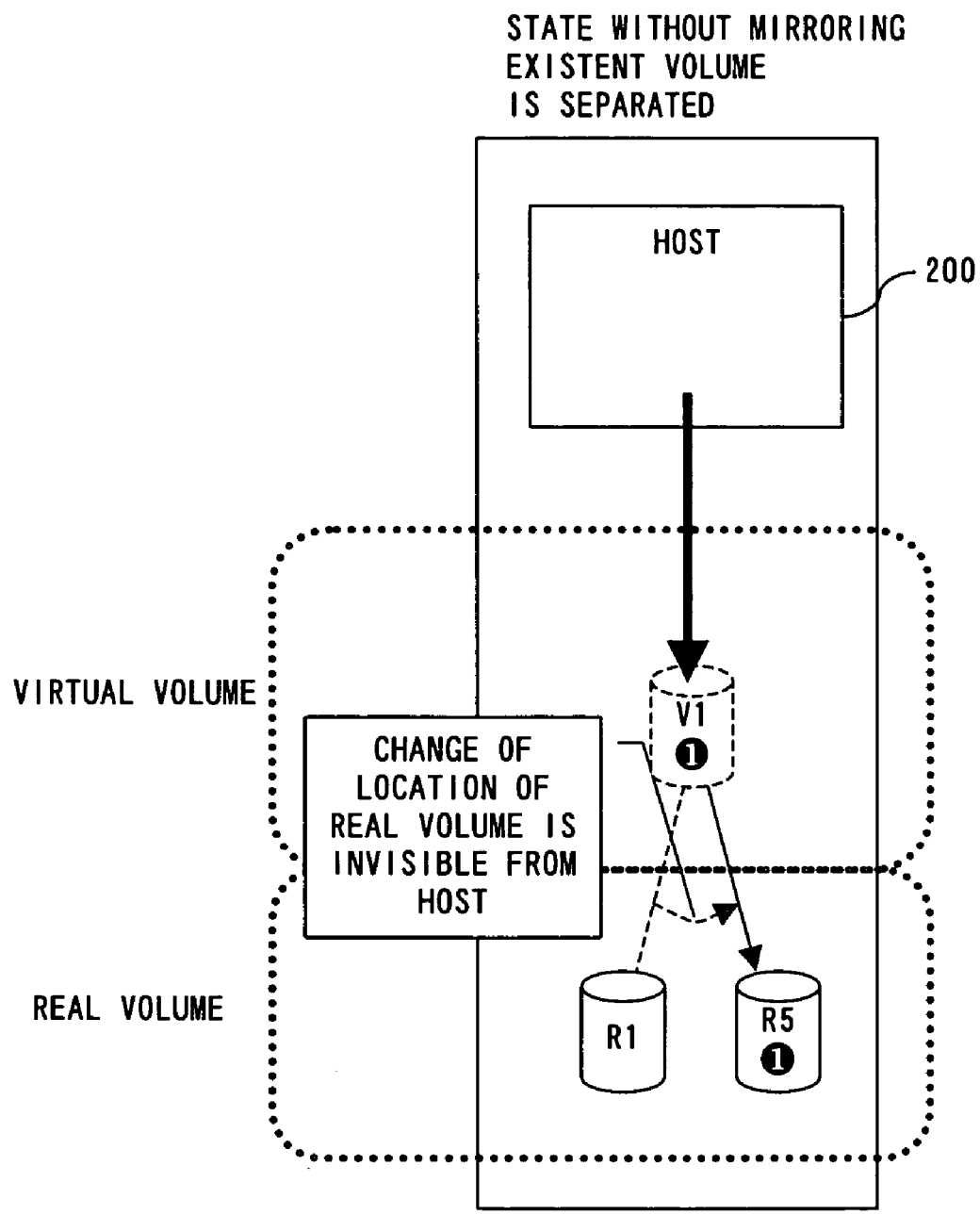
Figure 19:
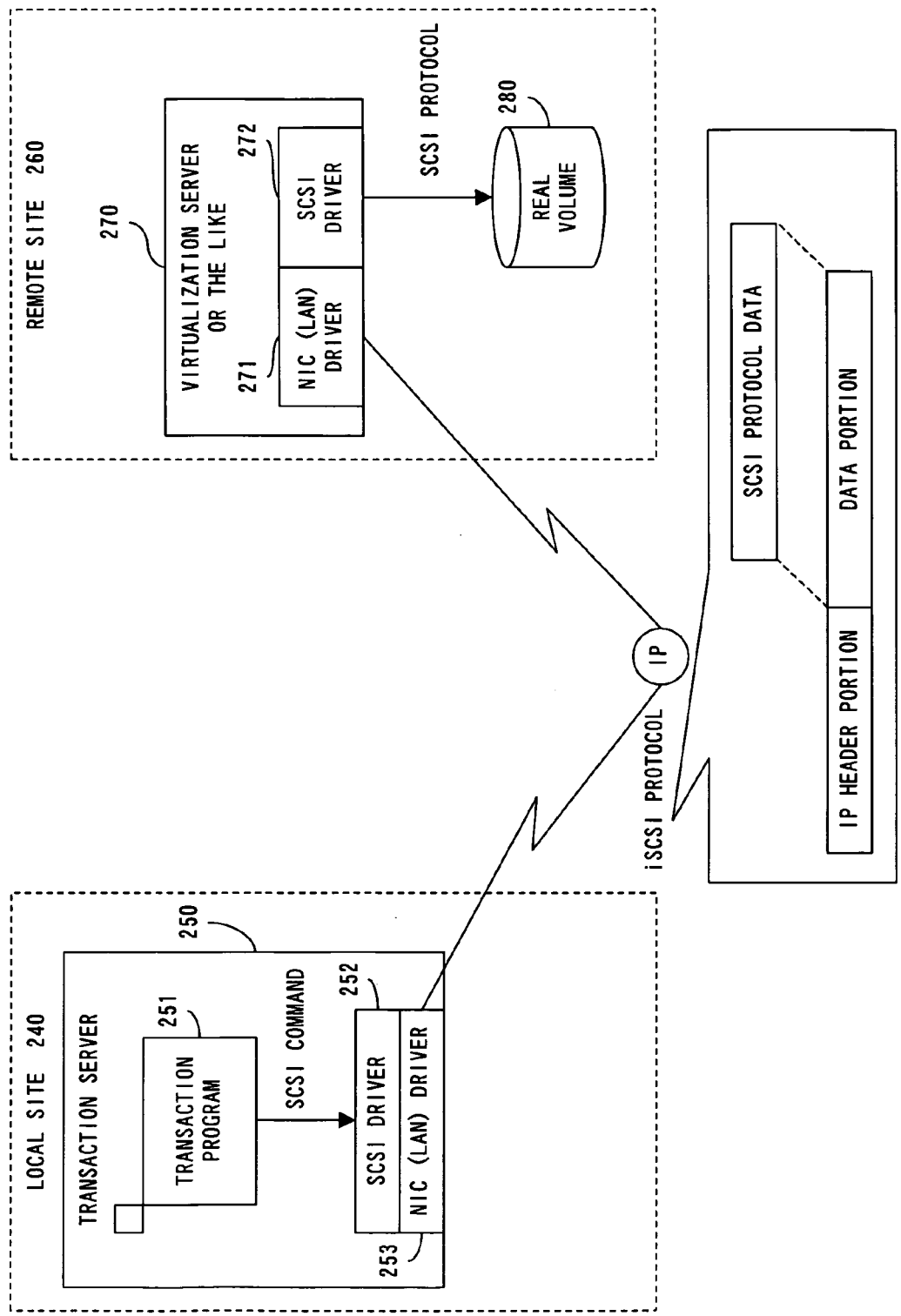
FIG. 19 is a view for explaining a conventional function of "SCSI access via an IP" (iSCSI).

FIG. 6 shows a situation in which the data 1, 2, 3, and 4 respectively stored in the real volumes R1 and R4 in the local site 10 and the real volumes R2 and R3 in the remote site 50 as in FIG. 5 is copied onto a real volume R5 which has been newly secured because the side of the local site 10 recovers sufficient available capacity or the like. Upon this, the function of "dynamic redistribution of real volume" explained as one of the conventional techniques is executed. Specifically, the mirroring once is conducted regarding the volumes as in FIG. 18B, and thereafter, similarly as in FIG. 18C, the real volumes R1 and R4 which originally belong to the local site 10 are separated, and the real volumes R2 and R3 which have been temporarily used with authorization of the remote site 50 are released. And, only the added real volume R5 is made to correspond to the virtual volume V1 (V1-1 to V1-4).

FIG. 7A shows an example of the above management data 36 on the side of the local site 10. FIG. 7B shows an example of the above management data 63 on the side of the remote site 50.

In FIG. 7A, each local site 10 (site 1 to site n) comprises information 80 common in the site and information 90 for each supervision target resource i as the above management data 36.

The information 80 common in the site comprises a location of temporary use destination 81, entire real capacity 82, available real capacity 83 and distributed real capacity 84. Additionally, parenthetical numerals from (81) to (123) appearing in formulae in FIG. 7A and views in FIG. 7 to FIG. 10 respectively correspond to the numerals for denoting respective data in the configuration of FIG. 7A and FIG. 7B in order to simplify the explanation of the views. For example, formula "(82)=(83)+(84)" appearing to the right of the information 80 common in site in FIG. 7A means "Entire real capacity 82=Available real capacity 83 +Distributed real capacity 84". This can be applied to the parenthetical numerals in FIG. 7 to FIG. 10.

The location of temporary use destination 81 is an IP address of the remote site 50 whose real volumes 70 are temporarily used. The entire real capacity 82 is the entire capacity of the real volumes in the local site 10. The available real capacity 83 is the entire available capacity of the real volumes in the local site 10. The distributed real capacity 84 is the sum of the capacity currently distributed from the real volumes in local site 10 to respective information processing resources i in the local site 10. In other words, the distributed real capacity 84 is the sum of lengths 101 of all the distributed regions j in all the resources j, which can be expressed by the formula below.

$$\text{Distributed real capacity } 84 = \Sigma_{ij} \text{ (length 101)}$$

The information 90 for each supervision target resource i comprises a supervision target 91, a capacity upper limit 92, current capacity 93, a threshold value for addition 94, a unit of addition 95, a supervision interval 96 and a designation of local aggregation 97. Further, the information 90 for each supervision target resource i comprises information 100 regarding a region which is distributed from the real volumes in the local site 10 to the corresponding supervision target resource i (referred to as the information 100 of distribution from the information's own site, hereinafter) and information 110 regarding a region which is distributed from the real volumes temporarily used with authorization of the remote site 50 to the corresponding supervision target resource i (referred to as the distribution information 110 from outside, hereinafter)

The supervision target 91 is a name or a discrimination ID or the like of the supervision target resource i (for example, a DB (database), a table, a file system or the like).

The capacity upper limit 92 is an upper limit value of capacity which is the sum of the real volumes in the local site 10 and the real volumes which are temporarily used with authorization of the remote site 50 (upper limit value of capacity extension).

The current capacity 93 is a value of currently used capacity which is the sum of the real volumes in the local site 10 and the real volumes which are temporarily used with authorization of the remote site 50. The current capacity 93 can be expressed by a formula below.

The current capacity 93=$\Sigma i$ (length 101)+$\Sigma k$ (length 111)

The threshold value for addition 94 is a threshold value to be used for determining whether or not the capacity is to be added (will be described later).

The unit of addition 95 is a value of capacity to be added to the corresponding resource i (for example, the addition of 2 GB or the like) when it is determined that the capacity is to be added.

The supervision interval 96 is a time interval or the time for checking the available capacity, which will be described later.

The designation of local aggregation 97 is a flag for example, and when the flag is on, a process of "aggregating all the data distributed in a remote site to a local site" is executed.

The information 100 of distribution from the information's own site is information regarding storage regions currently distributed from the real volumes in the local site 10 to the corresponding resource i, in which a top address 102 and the length 101 of each distributed region j are stored.

The information 110 from outside is information regarding the storage region currently distributed from the real volumes in the remote site 50 to the corresponding resource i, in which a top address 112 and the length 111 of each distributed region k are stored.

The management data 63 on the side of the remote site 50 holds authorization information 120 for each of authorizing destination sites 1 to n as shown in FIG. 7B.

The authorization information 120 comprises a location of authorizing destination 121, an authorization upper limit 122 and a currently authorized capacity 123. The location of authorizing destination 121 is an IP address of the local site 10 as the authorizing destination. The authorization upper limit 122 is the upper limit of the capacity whose temporary use by the local site 10 as the above authorizing destination is authorized. The currently authorized capacity 123 is the capacity whose temporary use by the local site 10 as the above authorizing destination is currently authorized.

Additionally, the location of authorizing destination 121, the authorization upper limit 122, the location of temporary use destination 81, the supervision target 91, the capacity upper limit 92, the threshold value for addition 94, the unit of addition 95 and the supervision interval 96 are set beforehand as items in the policy, however, they can be modified during operation.

FIG. 8A is a flowchart for showing an initial setting and supervision process by the virtualization server 30 on the side of the local site 10.

In FIG. 8A, upon the initial setting process, the virtualization server 30 first initializes values of the entire real capacity 82, the available real capacity 83 and the distributed real capacity 84 (step S21). Subsequently, as above, the location of the temporary use destination 81, the supervision target 91, the capacity upper limit 92, the threshold value for addition 94, the unit of addition 95 and the supervision interval 96 are set beforehand as items in the policy for each supervision target resource i. Further, values of the current capacity 93, the designation of local aggregation 97, the length 101, the top address 102, the length 111 and the top address 112 are initialized (step S22).

After the above initial setting process, the supervision processes in steps S23 to 26 are executed whenever it is needed.

The virtualization server 30 is in a standby state until a supervision process activation time comes that is specified by the supervision interval 96. When the supervision process activation time comes, the virtualization server 30 repeatedly executes processes in the steps S24 to S26 for each supervision target resource i, and when the processes regarding all the supervision target resources i are completed, the virtualization server 30 again gets into the standby state until the next supervision process activation time comes. In the processes in the steps S24 to S26, first it is determined whether or not the flag is on by referring to the designation of local aggregation 97 in the information 90 for each supervision target resource i to be processed (step S24). When the flag is on (YES in step S24), a process of aggregation to local (will be described in detail in FIG. 10B) is executed (step S25). When the flag is off (NO in step S24), a process of confirmation/addition of capacity (will be described in detail in FIG. 9A) is executed (step S26).

FIG. 8B is a flowchart for showing processes executed by the virtualization server 60 on the side of the remote site 50.

In FIG. 8B, first, the virtualization server 60 beforehand sets the location of the authorizing destination 121 and the authorization upper limit 122 as items in the policy (step S31). Also a value of the currently authorized capacity 123 is initialized (step S32).

After the initial setting process as described above, the virtualization server 60 executes an authorization process (will be described in detail in FIG. 9B) in accordance with the temporary use request from each local site 10, or a releasing process (will be described in detail in FIG. 10C) in accordance with a releasing request from each local site 10 (step S33).

FIG. 8C shows processes executed by being activated by a storage administrator when the real volumes are added in the side of the local site. These processes are activated when the storage administrator specifies individual real volumes in the case where the real volumes in one local site are to be located under virtualization control in the local site itself. In these processes, the capacity added in the step S26 is added to both of the entire real capacity 82 and the available real capacity 83 (step S41).

Figure 9A:
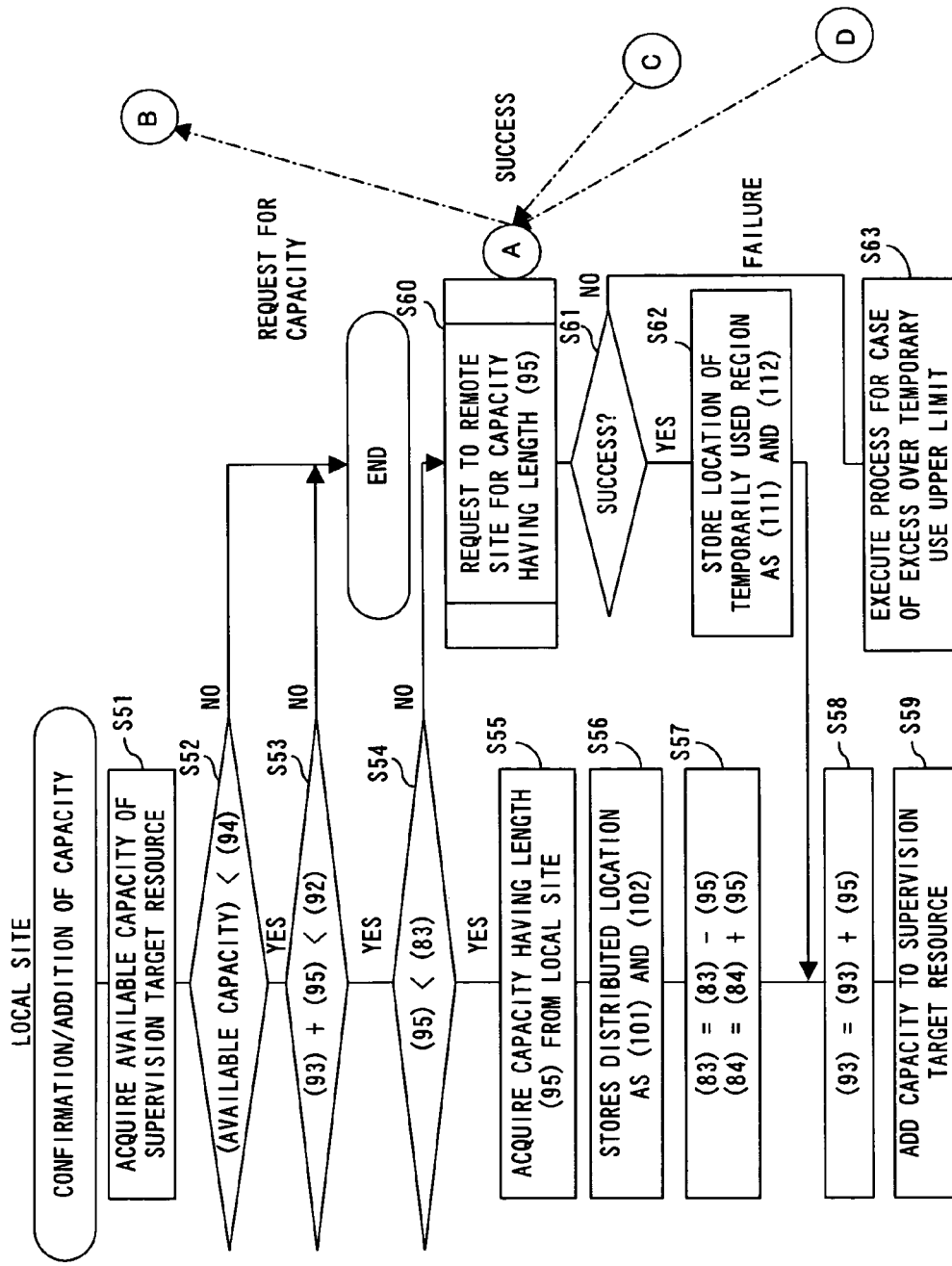
FIG. 9A is a detailed flowchart of processes of confirmation/addition of capacity in step S26.

FIG. 9A is a detailed flowchart of the processes of confirmation/addition of capacity in the above step S26. These processes are executed by the capacity distribution control unit 34.

FIG. 9B is a detailed flowchart of the authorization process among processes in the step S33 in the case where the request for capacity addition is made in the processes of FIG. 9A.

The virtualization server 30 on the side of the local site 10 executes the processes shown in FIG. 9A when the flag designated by the designation of local aggregation 97 is not on in the above step S24.

The virtualization server 30 first acquires the available capacity of the supervision target resource i (step S51). Specifically, the virtualization server 30 acquires the available capacity of the database or the file system which is the supervision target. A capacity management interface (command or the like) or the like specific to the database or the file system can be used as the method of acquisition for example.

Subsequently, when the acquired available capacity is smaller than the threshold value for addition 94 (YES in step S52) and also the inequality of "Current capacity 93+Unit of addition 95<Capacity upper limit 92" is satisfied, in other words, when the upper limit of the capacity extension is not exceeded even when the capacity addition in a predetermined unit is conducted (YES in step S53), the processes in step S54 and the subsequent steps are executed. When the above conditions are not satisfied, these processes are ended.

Next, it is determined whether or not the inequality of "Unit of addition 95<Available real capacity 83" is satisfied (step S54). In other words, it is determined whether or not the real volumes in the site of the virtualization server 30 can cover the capacity addition. When the real volumes in the site of the virtualization server 30 can cover (YES in step S54), the capacity as much as the unit of addition 95 is acquired from the available region in the real volumes in the local site 10 (step S55), and stores the top address and the length of the acquired region respectively as the top address 102 and the length 101 of the distributed region j (step S56). Then, the available real capacity 83 and the distributed real capacity 84 are respectively updated as below (step S57).

Available real capacity 83=Available real capacity 83−Unit of addition 95

Distributed real capacity 84=Distributed real capacity 84+Unit of addition 95

Also, the value of the current capacity 93 regarding the resource i which is currently the process target is updated as below.

Current capacity 93=Current capacity 93+Unit of addition 95

Finally, the capacity is added to the process target resource i (step S59), and the present processes are ended. Additionally, the process in the step S59 is realized by executing the function of "dynamic capacity addition of volume" as one of the above described conventional techniques.

When it is determined that the real volumes in the site of the virtualization server 30 can not cover the capacity addition in the above step S54 (NO in step S54), the capacity is temporarily used with authorization of the remote site 50.

Specifically, a request is made to the remote site 50 specified by the location of temporary use destination 81 for the temporary use of the capacity as much as the unit of addition 95 (step S60).

On the side of the remote site 50, when receiving this temporary use request (step S71), it is first determined whether or not the inequality of "Unit of addition 95+Currently authorized capacity 123<Authorization upper limit 122" is satisfied (step S72) In other words, it is determined whether or not the upper limit of the capacity whose temporary use by the requesting local site 10 is authorized is not exceeded even when the capacity as much as the unit of addition 95 which is requested is added to the capacity whose temporary use by the corresponding local site 10 is currently authorized. When the above upper limit is exceeded (NO in step S72), the answer that "Temporary use of capacity can not be authorized any more because upper limit of authorization would be exceeded (Failure)" is sent to requesting local site 10 (step S76).

To the contrary, when the authorization upper limit 122 is not exceeded even when the temporary use of the capacity as much as the unit of addition 95 is further authorized (YES in step S72), an available region as much as the unit of addition 95 is acquired from the real volumes in the requested remote site (step S73) and also, the value of the currently authorized capacity 123 is updated, in other words, the equality of "Currently authorized capacity 123=Currently authorized capacity 123+Unit of addition 95" is satisfied (step S74). Then, the location of the region whose temporary use is authorized (top address and length of the acquired storage region) is transmitted to the requesting local site 10 (step S75).

On the side of the local site 10, when receiving the above answer in the step 76, i.e. when receiving the answer indicating the failure (NO in step S61), a process for the case where the temporary use upper limit is exceeded is executed (step S63), then, the present processes are ended. The process in the step S63 is, for example, a process in which the fact that the temporary use of the capacity can not be authorized any more by the corresponding remote site is recorded, and thereby, the request for the capacity can not be made to the corresponding remote site (however, it is possible that the temporary use request can be issued again after returning of the capacity). Alternatively, the process in the step S63 can be a process of outputting a message indicating the "Excess over the temporary use upper limit" to a terminal of a storage administrator of the local site. The storage administrator receiving this message solves the lack of the available capacity in the local site 10 by taking counter measures as below.

Increasing available capacity by deleting unnecessary data.

Preparing available real volumes by newly adding real volumes (additionally, upon this, the process shown in FIG. 8C may be executed by being activated by the storage administrator).

Preparing available real volumes by aggregating plurality of data each in a small size stored separately in a plurality of real volumes to one real volume.

Making real volumes available by temporarily storing, in secondary media (magnetic tape, DVD or the like), data which has been stored in real volumes with lower access frequencies.

To the contrary, when the above answer in the step S75, i.e. data of the location of the region whose temporary use is authorized, is transmitted as a result of success of getting authorization for the temporary use of the capacity (YES in step S61), the above data of the location of the region whose temporary use is authorized (top address and length of the acquired storage region) is stored as the top address 112 and the length 111 in the distribution information 110 from outside (step S62). Subsequently, the processes in the above steps S58 and S59 are executed.

Figure 10C:
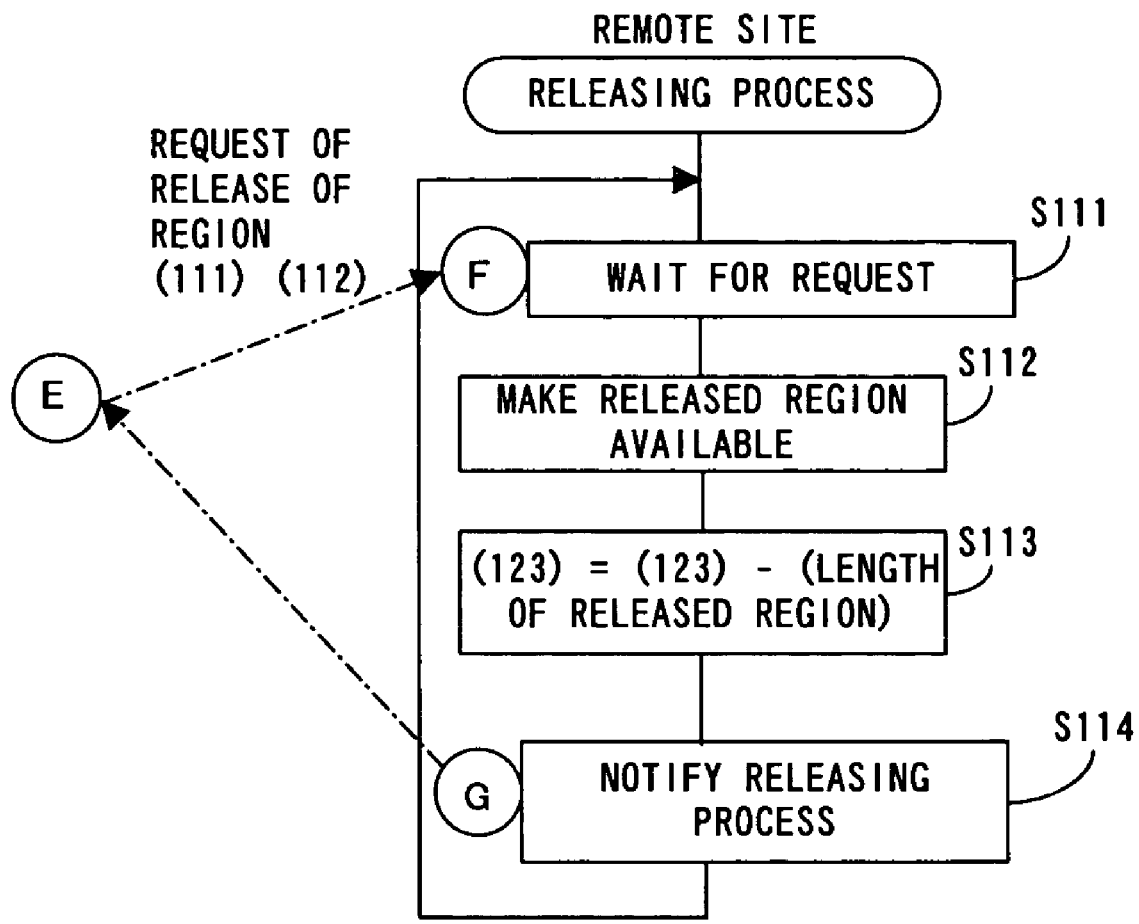
FIG. 10C is a detailed flowchart of releasing a process among processes in step S33 executed when a releasing request for a region is issued in the processes in FIG. 10B.

FIG. 10A to FIG. 10C respectively show flowcharts of respective processes of the local aggregation processes in the step S25 in FIG. 8A.

FIG. 10A shows processes of turning on the flag of the designation of local aggregation 97 (step S81). The processes in the step S81 are executed for example when a user or the like specifies an arbitrary resource i in order to give an instruction to aggregate the entire capacity to the side of the local site 10.

FIG. 10B is a detailed flowchart of the local aggregation process in the above step S25. These processes are executed by the aggregation unit 35.

FIG. 10C is a detailed flowchart of the releasing process among the processes in the step S33 executed when the releasing request for the region is issued in the processes in FIG. 10B.

The virtualization server 30 on the side of the local site 10 executes processes shown in FIG. 10B when the flag designated by the designation of local aggregation 97 is on in the processes in the above step S24.

First, it is determined whether or not the inequality of "Current capacity 93<Available real capacity 83" is satisfied (step S91). In other words, it is determined whether or not the available real capacity 83 exceeds the currently used capacity of the recourse i which includes the capacities of the local site 10 and the remote site 50. This determination means determination whether or not there is sufficient capacity to store the data aggregated to the side of the local site 10. When there is not the sufficient capacity (NO in the step S91), the present processes are ended.

When there is the sufficient capacity to store the data aggregated to the side of the local site 10 (YES in the step S91), the capacity as much as the current capacity 93 is acquired from the real volume in the local site 10 (step S92). In other words, a storage region as the transference destination to which the data currently distributed in the local site 10 and the remote site 50 is transferred is secured. Also, upon this, values of the available real capacity 83 and the distributed real capacity 84 are once updated (step S93) In other words, the values are updated so that inequalities as below are satisfied.

Available real capacity 83=Available real capacity 83−Current capacity 93

Distributed real capacity 84=Distributed real capacity 84+Current capacity 93

Subsequently, the top address 102 and the length 101 in the information 100 of distribution from the information's own site are respectively set to the top address and the length of the storage region as the transference destination acquired as above (step S94), and the volume as the transference destination is prepared (step S95).

Then, based on the function of "dynamic redistribution of real volume" as one of the above described conventional techniques, the data which is currently distributed to the local site 10 and the remote site 50 is transferred to the storage region acquired in the above step S92. In other words, the data is aggregated (step S96).

When the data has been transferred to a new storage region as above, the storage region which has been temporarily used with authorization of the remote site 50 for this data is released. Specifically, the releasing request to which the top address 112 and the length 111 of the distributed region k regarding the above temporarily used storage region are added is transmitted to the remote site 50 having the IP address as the location of temporary use destination 81 (step S97).

The virtualization server 60 on the side of the remote site 50, when receiving this releasing request (step S111), makes the storage region available, which is specified by the above top address 112 and the length 111 added to the releasing request (step S112). Subsequently, the value of the currently authorized capacity 123 in the authorization information 120 regarding the local site 10 which has issued the releasing request is updated based on the equality of "Currently authorized capacity 123=Currently authorized capacity 123−Length 111 of released capacity" (step S113).

Then, fact of the completion of the releasing process is notified to the local site 10 which has issued the releasing request (step S114).

The virtualization server 30 in the local site 10 which has received the above notification deletes information of the distributed region k which has been released in the information 110 from outside (step S98). Also, storage regions in the local site 10 which were used for storing the data transferred to the above new storage regions are recognized as available regions while storage regions in the remote site 50 which were used for storing the data transferred to the above new storage regions were released as above (step S99). Accompanying this, the distributed region j regarding the storage region which has been made available is deleted. Also, values of the available real capacity 83 and the distributed real capacity 84 are updated (step S100). Specifically, the values are updated so that equalities as below are satisfied.

Available real capacity 83=Available real capacity 83+Length 101 of distributed region j as transference destination Distributed real capacity 84=Distributed real capacity 84−Length 101 of distributed region j as transference destination Finally, the flag of the designation of local aggregation 97 is turned off (step S101), and the present processes are ended.

As explained above, according to the method of managing storage capacity, the computer (server or and the like) for executing the above method, the program for causing the computer to execute the above method, and the recording medium for recording the above program and the like in the present example, when addition of capacity is needed in each information processing resource, the situation is dealt with basically by distributing the real volumes in the resource's own site, and when the above situation can not be dealt with by distributing the real volumes in the above resource's own site, the situation can be dealt with by temporarily using capacity from another site. Further, when the above temporary use becomes unnecessary because the side of the temporary use site solves the lack of capacity or the like, the temporarily used volumes can be released.

Thereby, a lack of capacity can be dealt with by temporarily using the capacity from another site, and it is not necessary that spare real volumes are prepared in a site itself in advance taking sudden increase of necessary capacity into consideration, for example. Further, these processes are almost completely automatically executed so that an administrator or the like does not have to supervise conditions regarding available capacity of each information processing resource for giving instructions of increase/decrease of capacity, which leads to reduction of burden of manpower. Further, in the case where real volumes in another site are temporarily used, usually a rental fee is charged in accordance with use period, however, in the method according to the present example, the temporarily used volumes are automatically released when the temporarily used volumes become unnecessary so that the volumes can be temporarily used only for the really necessary period. Accordingly, temporary use for an unnecessarily long period that leads to a high cost can be avoided. In other words, the present example can also bring about an effect of reduction of cost for the storage rental fee.

Additionally, in the above explanation, a configuration is explained where it is only the side of the local site 10 that temporarily uses volumes and it is only the side of the remote site 50 that authorizes the temporary use of the volumes. However, the present invention is not limited to the above configuration, and can employ a configuration where the above two sites temporarily use and authorize the temporary use of the volumes to each other. Thereby, each site can authorize the temporary use of the volumes when it has extra available capacity, and can temporarily use the volumes when it does not have the extra available capacity so that each site does not have to prepare extra available capacity in a large amount.

Additionally, in the above explanation, the iSCSI protocol is employed. However, the present invention is not limited to the above protocol, and can employ any of other protocols that can be called "SCSI protocol utilizing IP" (e.g. SAN-IP, FC-IP, iFCP or the like).

Figure 11:
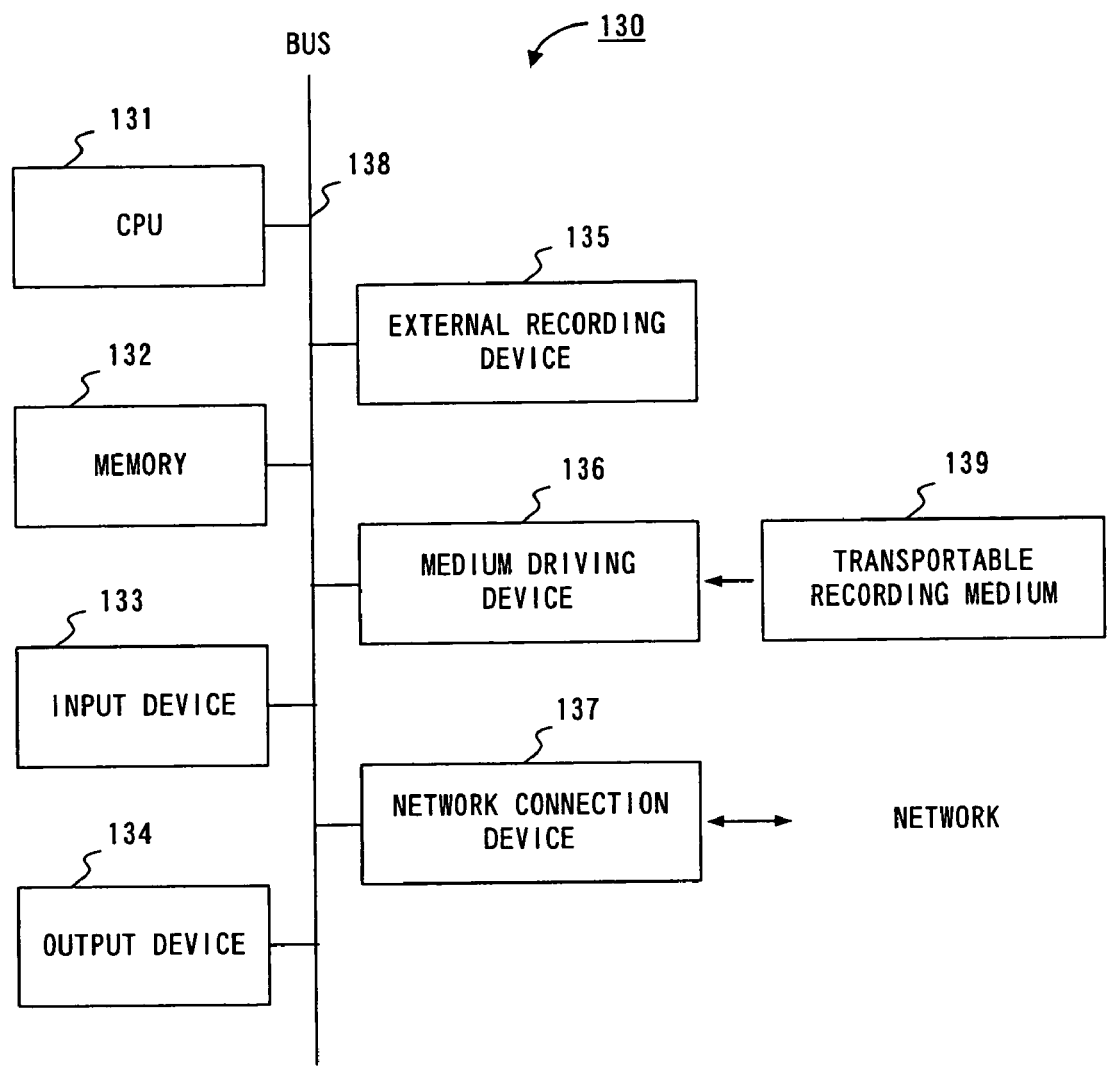
FIG. 11 shows an example of a hardware configuration of a computer (virtualization server) for executing a method of managing storage capacity according to an embodiment of the present invention.
Figure 13:
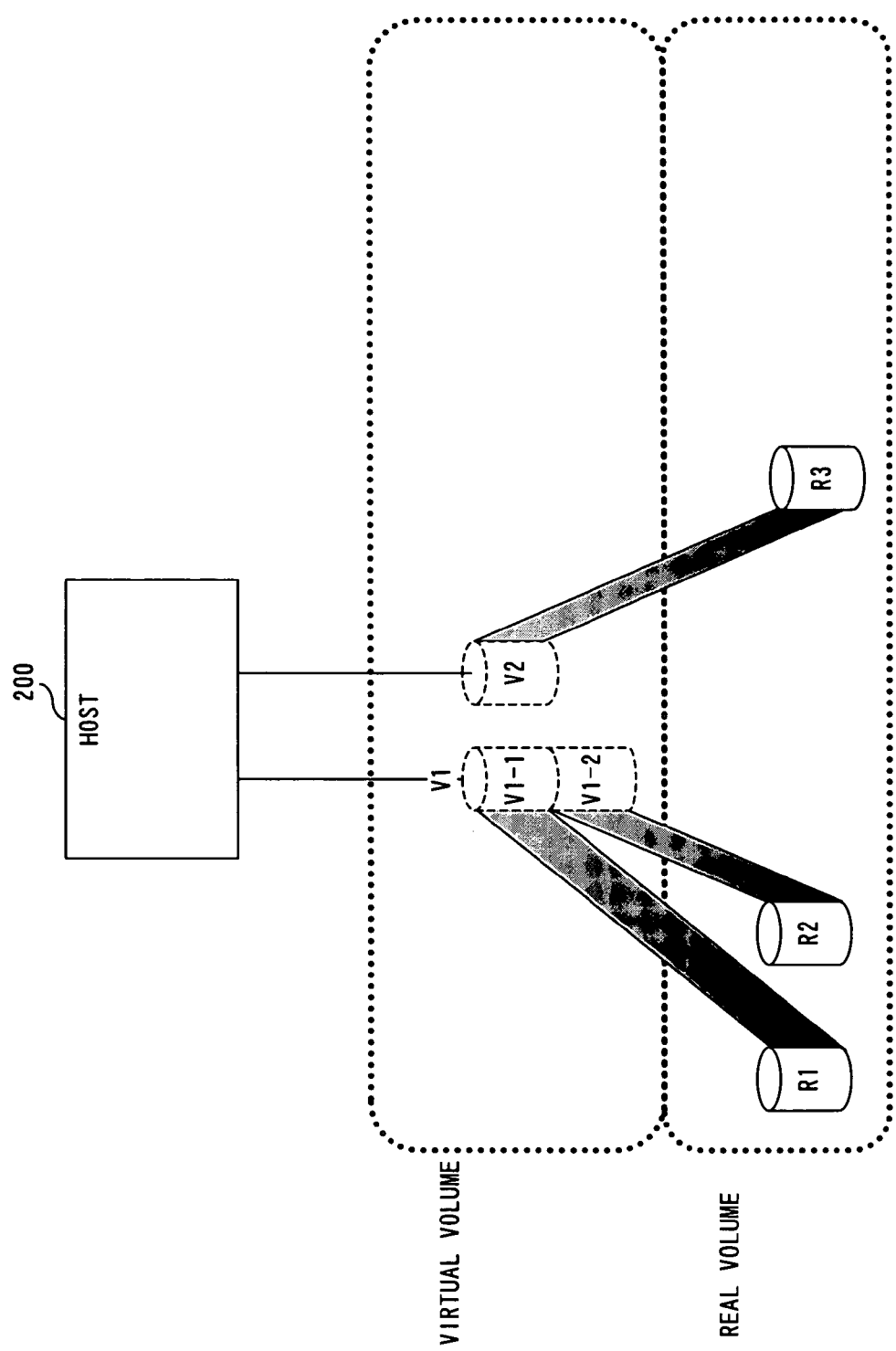
FIG. 13 is a first view for explaining a conventional function of "virtualization of volume"
Figure 14A:
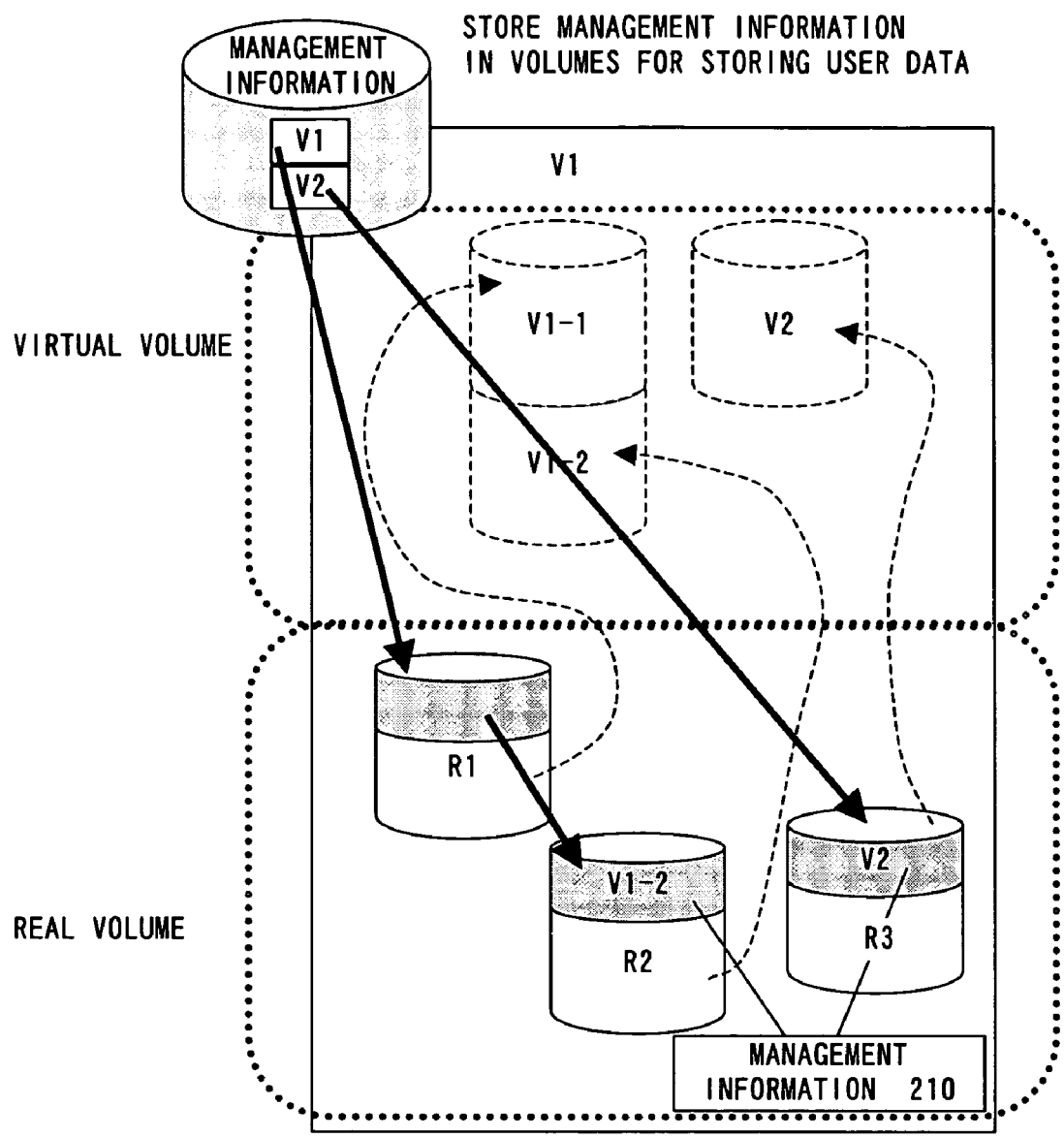
FIGS. 14A and B are second views for explaining the conventional function of "virtualization of volume"
Figure 14B:
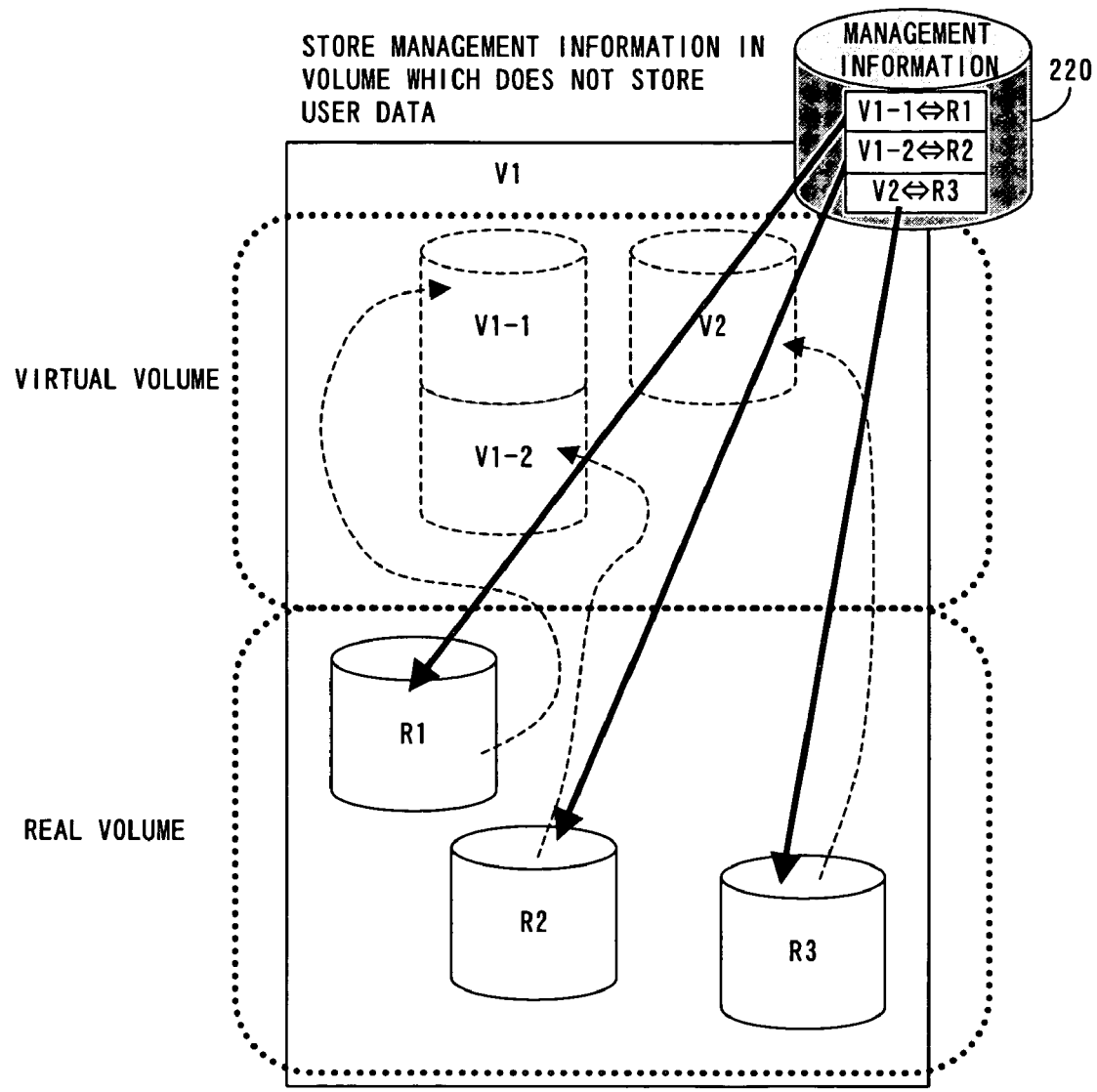
Figure 15:
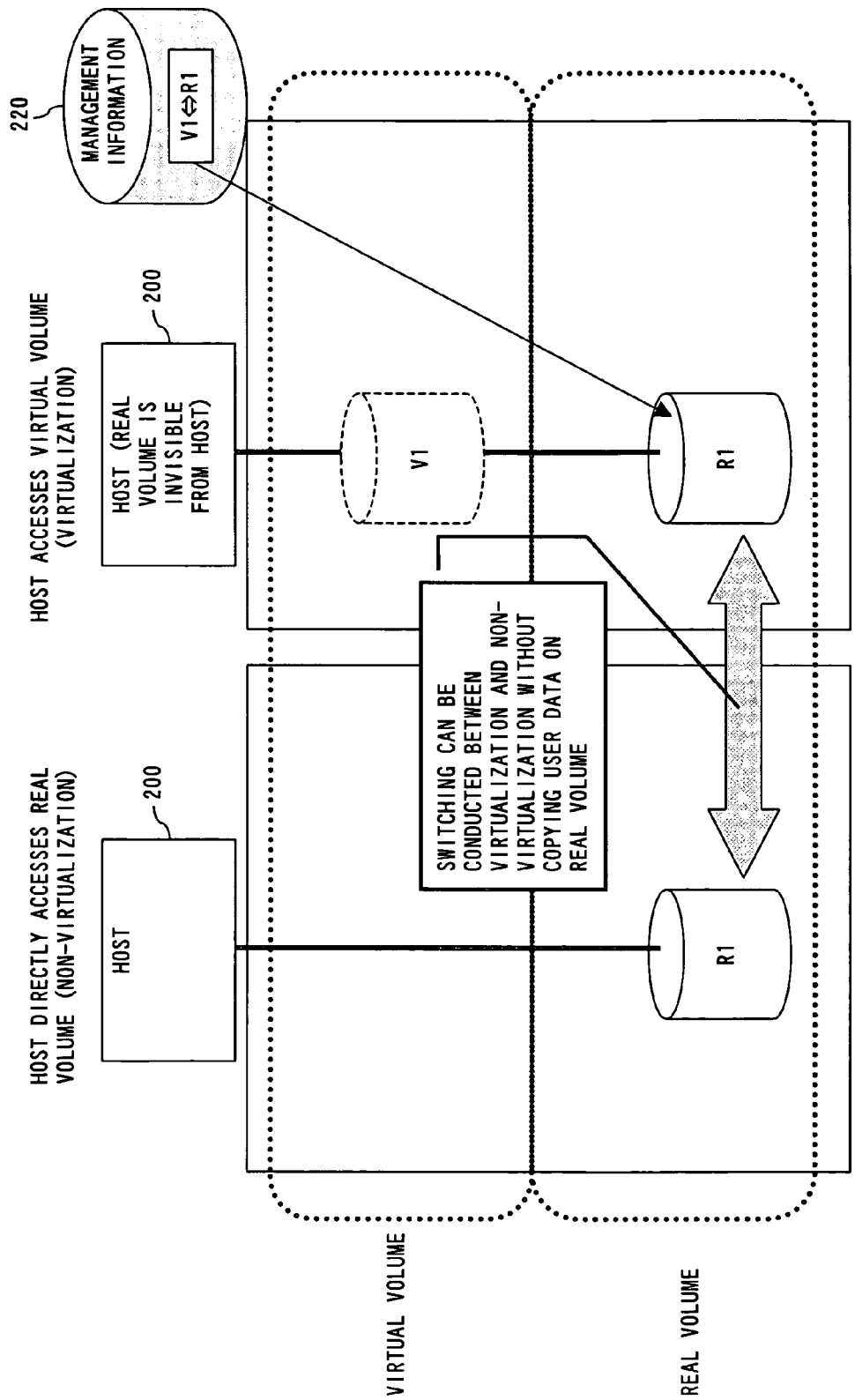
FIG. 15 are views for explaining a conventional function of "switching between virtualization and non-virtualization of volume"

FIG. 11 shows an example of a hardware configuration of a computer 130 (the virtualization servers 30 and 60) for executing the above method of managing storage capacity.

The computer 130 whose configuration is shown in FIG. 11 comprises a CPU 131, memory 132, an input device 133, an output device 134, an external recording device 135, a medium driving device 136, a network connection device 137 and the like which are connected to a bus 138. This configuration shown in FIG. 11 is an example, and the present invention is not limited to this example.

The CPU 131 is a central processing unit for controlling the entirety of the computer 130.

The memory 132 is memory such as RAM or the like for temporarily storing program or data recorded in the external recording device 135 (or a transportable recording medium 139) upon the execution of the program and the update of the data or the like. The CPU 131 executes a process for realizing the method of managing storage capacity shown in FIG. 8 to FIG. 10 and the like by using the program/data which is read out to the memory 132.

The input device 133 is, for example, a keyboard, a mouse, a touch panel or the like.

The output device 134 is, for example, a display, a printer or the like.

The external recording device 135 is, for example, a magnetic disk device, an optical disk device, a magneto optical disk device or the like in which program/data (the processing program shown in FIG. 8 to FIG. 10, the data shown in FIG. 7 and the like) for causing the computer 130 to execute the process of the above method of managing storage capacity is stored.

The medium driving device 136 reads the program, the data or the like stored in the transportable recording medium 139. The transportable recording medium 139 is, for example, a FD (flexible disk), a CD-ROM, a memory card, a DVD, a magneto optical disk or the like.

The network connection device 137 connects the computer to a network, and realizes transmission and reception of the program, the data and the like to/from external information processing devices.

FIG. 12 shows an example of the recording medium that has recorded the above program and downloading of the program.

As shown, it is possible that the program/data that realizes the function of the present invention is read from the transportable recording medium 139 to the side of the computer 130, and stored in the memory 132 to be executed. Alternatively, it is also possible that the program/data stored in a storage unit 141 in an external server 140 is downloaded via a network 150 (the Internet or the like) to which the computer 130 is connected by the network connection device 137.

In addition, the configuration of the present invention is not limited to a device or a method, and can be a recording medium itself (the transportable recording medium 139 or the like) for storing the above program/data, or can be the above program itself.

As explained above, in the present invention, processes can be automatically executed where necessary capacity is distributed to respective information processing resources in the resources' own site at anytime by storage virtualization of real volumes in the above resources' own site, and when a lack of capacity can not be dealt with only by the real volumes in the above resources' own site (lack of the real volumes), the real volumes in an external server are temporarily put into service and released when the real volumes in the above external server becomes unnecessary. Accordingly, the real volumes in the resources' own site can be fully utilized, a sudden requirement of the capacity or the like can be dealt with by temporarily using the real volumes in the external site, and the temporarily used capacity is released when the temporarily used capacity becomes unnecessary, so that the lack of the real volumes can be flexibly dealt with. Further, because a computer automatically executes processes of the distribution of the real volumes in the resources' own site to the respective information processing resources, the determination that the lack of capacity can not be dealt with by the above resources' own site and the temporary use of capacity in the external site, a user does not have to determine or operate by himself/herself.

What is claimed is:

1. A server in a site in which storage virtualization is implemented, comprising:

capacity management information storage unit for storing therein available real capacity in an entirety of real volumes in the unit's own site and capacity distribution information for each supervision target resource in the unit's own site; and capacity distribution control unit for distributing additional capacity to a supervision target resource whose current available capacity has become less than a predetermined threshold value by using real volumes in the unit's own site when the real volumes in the unit's own site can deal with in accordance with available real capacity in an entirety of the real volumes in the unit's own site, and for distributing additional capacity to the supervision target resource by temporarily using real volumes in another site when the real volumes in the unit's own site can not deal with.

2. The server according to claim 1, further comprising:

aggregation unit for aggregating data stored in the real volumes in said another site to an available region in the unit's own site and for releasing the real volumes in said another site, when an available region can be secured in real volumes in the unit's own site after the temporary use of the real volumes in said another site.

3. The server according to claim 1, wherein:

the capacity distribution control unit distributes additional capacity to the supervision target resource by executing a function of "dynamic capacity addition of volume" based on the storage virtualization.

4. The server according to claim 2, wherein:

the aggregation unit aggregates the data to the available region by executing a function of "dynamic redistribution of real volume" in which volumes are temporarily put in a mirrored state by a virtualization control based on the storage virtualization.

5. The server according to claim 1, wherein:

the real volumes temporarily used in said another site are accessed by using a SCSI protocol which utilizes an IP.

6. A method of managing storage capacity in a site in which storage virtualization is implemented, comprising:

determining whether or not capacity distributed to a supervision target resource can be increased by real volumes in the site itself when it is determined that an arbitrary supervision target resource in the site itself needs a capacity extension;

extending capacity distributed to the supervision target resource by using real volumes in the site itself when it is determined that the capacity distributed to the supervision target resource can be increased by real volumes in the site itself; and temporarily using real volumes in another site when it is determined that the capacity distributed to the supervision target resource can not be increased by real volumes in the site itself.

7. The method of managing storage capacity according to claim 6, wherein:
data stored in the real volumes in said another site is aggregated to the site itself and the real volumes in said another site are released, when the site itself recovers sufficient available real capacity after the temporary use of the real volumes in said another site.

8. The method of managing storage capacity according to claim 6, wherein:
the real volumes temporarily used in said another site are accessed by using a SCSI protocol which utilizes an IP.

9. A recording medium which can be read by a computer and which stores a program for causing the computer to execute:
a function of storing virtualization management data specifying correspondence between a virtual volume and a real volume;
a function of storing entire real capacity, available real capacity, distributed real capacity in an entirety of real volumes in the computer's own site, and at least current available capacity for each supervision target resource in the computer's own site; and
a function of distributing additional capacity to a supervision target resource whose current available capacity has become less than a predetermined threshold value by using real volumes in the computer's own site when the real volumes in the computer's own site can deal with in accordance with available real capacity in an entirety of the real volumes in the computer's own site, and of distributing additional capacity to the supervision target resource by temporarily using real volumes in another site when the real volumes in the computer's own site can not deal with.

10. The recording medium according to claim 9 for causing the computer to further realize:
a function of aggregating data stored in the real volumes in said another site to an available region in the computer's own site and of releasing the real volumes in said another site, when an available region can be secured in the real volumes in the computer's own site after the temporary use of the real volumes in said another site.

* * * * *